US012671032B2

(12) United States Patent
Sasaki

(10) Patent No.: US 12,671,032 B2
(45) Date of Patent: Jun. 30, 2026

(54) MULTILAYER CERAMIC CAPACITOR AND MULTILAYER CERAMIC CAPACITOR-MOUNTED STRUCTURE

(71) Applicant: Murata Manufacturing Co., Ltd., Nagaokakyo (JP)

(72) Inventor: Tomohiro Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 109 days.

(21) Appl. No.: 18/675,193

(22) Filed: May 28, 2024

(65) Prior Publication Data
US 2024/0312709 A1     Sep. 19, 2024

Related U.S. Application Data

(63) Continuation of application No. PCT/JP2023/016528, filed on Apr. 26, 2023.

(30) Foreign Application Priority Data

Jul. 12, 2022     (JP) ................................. 2022-111724

(51) Int. Cl.
$H01G\ 4/012$          (2006.01)
$H01G\ 4/248$          (2006.01)
(Continued)

(52) U.S. Cl.
CPC ............. $H01G\ 4/012$ (2013.01); $H01G\ 4/248$ (2013.01); $H01G\ 4/30$ (2013.01); $H01G\ 4/40$ (2013.01)

(58) Field of Classification Search
None
See application file for complete search history.

(56) References Cited

U.S. PATENT DOCUMENTS 11,894,198 B2 *   2/2024   Okuda ................... H01G 4/008
12,040,136 B2 *   7/2024   Ishizuka ................ H01G 4/248
(Continued)

FOREIGN PATENT DOCUMENTS

CN        215527480 U  *  1/2022
CN        115394554 A  *  11/2022  ............. H01G 13/06
(Continued)

OTHER PUBLICATIONS

International Search Report in PCT/JP2023/016528, mailed Jul. 25, 2023, 3 pages.

(Continued)

*Primary Examiner* — Dion R. Ferguson
(74) *Attorney, Agent, or Firm* — Keating & Bennett, LLP

(57)          ABSTRACT

A multilayer ceramic capacitor includes a multilayer body including first and second main surfaces, first and second side surfaces, and first and second end surfaces, first and second inner electrode layers on laminated dielectric layers and extending to the first and second end surfaces, first and second outer electrodes respectively on the first and second end surfaces, a third outer electrode on the first side surface, and a fourth outer electrode on the second side surface. The first inner electrode layers each have a first opposing portion facing the second inner electrode layers, a first extended portion extending from the first opposing portion to the first end surface, and a second extended portion extending from the first opposing portion to the second end surface. The second inner electrode layers each include first and second extension portions that are partially or entirely bent toward the second main surface.

20 Claims, 11 Drawing Sheets

(51) Int. Cl.
*H01G 4/30* (2006.01)
*H01G 4/40* (2006.01)

(56) References Cited

U.S. PATENT DOCUMENTS

| | | | | |
|---|---|---|---|---|
| 2003/0029632 A1* | 2/2003 | Anthony, Jr. | ......... | H01L 23/552 174/250 |
| 2015/0116902 A1* | 4/2015 | Sakai | ..................... | H01G 4/232 361/301.4 |
| 2018/0082793 A1* | 3/2018 | Satoh | .................. | H01G 4/2325 |
| 2018/0166217 A1* | 6/2018 | Kato | ...................... | H01G 4/012 |
| 2020/0152385 A1* | 5/2020 | Ishizuka | ............... | H01G 4/232 |
| 2022/0148807 A1* | 5/2022 | Ishizuka | ............... | H01G 4/248 |
| 2023/0020333 A1* | 1/2023 | Shimada | ................ | H01G 4/008 |
| 2023/0034387 A1* | 2/2023 | Okuda | .................. | H01G 4/012 |
| 2023/0343521 A1* | 10/2023 | Sasaki | ...................... | H01G 4/30 |
| 2024/0234033 A1* | 7/2024 | Yasuda | ............... | H01G 4/1227 |
| 2024/0312709 A1* | 9/2024 | Sasaki | ...................... | H01G 4/30 |
| 2025/0292963 A1* | 9/2025 | Nakagawa | ............ | H01G 4/008 |
| 2025/0299880 A1* | 9/2025 | Nakanishi | ................ | H01G 4/30 |

FOREIGN PATENT DOCUMENTS

| | | | | | | |
|---|---|---|---|---|---|---|
| CN | 116417244 A | * | 7/2023 | ............ | H01G 4/012 |
| JP | H0955335 A | | 2/1997 | | |
| JP | 2004536452 A | * | 12/2004 | | |
| JP | 2015043448 A | * | 3/2015 | ............ | H01G 4/232 |
| JP | 2017228759 A | * | 12/2017 | ............ | H01G 4/005 |
| JP | 2020077792 A | * | 5/2020 | .............. | H01G 4/30 |
| JP | 2020077815 A | | 5/2020 | | |
| JP | 2022075191 A | * | 5/2022 | ............ | H01G 4/30 |
| KR | 20120080652 A | * | 7/2012 | ............ | H01G 4/01 |
| WO | WO-2023189448 A1 | * | 10/2023 | ............ | H01G 4/12 |
| WO | WO-2024116557 A1 | * | 6/2024 | ............ | H01G 2/12 |

OTHER PUBLICATIONS

Written Opinion in PCT/JP2023/016528, mailed Jul. 25, 2023, 3 pages.

* cited by examiner

IV-IV CROSS-SECTIONAL VIEW

V-V CROSS-SECTIONAL VIEW

VI-VI CROSS-SECTIONAL VIEW

VII-VII CROSS-SECTIONAL VIEW

V-V CROSS-SECTIONAL VIEW $$16\begin{cases}16a\\16b\end{cases} \quad 25\begin{cases}25a\\25b\\25c\end{cases} \quad 30\begin{cases}30c\\30d\end{cases} \quad 32\begin{cases}32c\\32d\end{cases} \quad 34\begin{cases}34c\\34d\end{cases}$$

MULTILAYER CERAMIC CAPACITOR AND MULTILAYER CERAMIC CAPACITOR-MOUNTED STRUCTURE

CROSS REFERENCE TO RELATED APPLICATIONS

This application claims the benefit of priority to Japanese Patent Application No. 2022-111724 filed on Jul. 12, 2022 and is a Continuation Application of PCT Application No. PCT/JP2023/016528 filed on Apr. 26, 2023. The entire contents of each application are hereby incorporated herein by reference.

BACKGROUND OF THE INVENTION

1. Field of the Invention

The present invention relates to multilayer ceramic capacitors and multilayer ceramic capacitor-mounted structures.

2. Description of the Related Art

Feedthrough multilayer ceramic capacitors are known which are used, for example, as a decoupling capacitor for stabilizing a power supply voltage supplied to integrated circuit components (ICs) that operate at a high speed, or as a noise suppression component for a power supply line supplied to integrated circuit components (ICs).

Feedthrough multilayer ceramic capacitors have a common structure including a ceramic main body (multilayer body) having an outer surface including first and second main surfaces opposite to each other, first and second side surfaces opposite to each other, and first and second end surfaces opposite to each other. In the interior of the ceramic main body, a plurality of first inner electrodes and a plurality of second inner electrodes are disposed alternately in the direction of lamination. Both ends of the first inner electrodes are led out to the first and second end surfaces, and are connected to a first outer electrode and a second outer electrode, respectively. Both ends of the second inner electrodes are led out to the first and second side surfaces, and are connected to a third outer electrode and a fourth outer electrode, respectively (see, for example, Japanese Unexamined Patent Application Publication No. 9-55335).

In order to improve the performance of such a feedthrough multilayer ceramic capacitor, it is necessary to reduce ESL (equivalent series inductance) as a parasitic component (hereinafter referred to as low ESL characteristics) and enhance the effect of removing high-frequency noise.

However, in the common feedthrough multilayer ceramic capacitor as described in Japanese Unexamined Patent Application Publication No. 9-55335, the distance between a second inner electrode, disposed near an upper outer layer, and a substrate is long, and therefore the current path is long. This makes it difficult to achieve low ESL characteristics.

SUMMARY OF THE INVENTION

Example embodiments of the present invention provide multilayer ceramic capacitors and multilayer ceramic capacitor-mounted structures each with improved low ESL characteristics.

A multilayer ceramic capacitor according to an example embodiment of the present invention includes a multilayer body including a plurality of laminated dielectric layers, a first main surface and a second main surface opposite to each other in a height direction, a first side surface and a second side surface opposite to each other in a width direction perpendicular or substantially perpendicular to the height direction, and a first end surface and a second end surface opposite to each other in a length direction perpendicular or substantially perpendicular to the height direction and the width direction, first inner electrode layers on the plurality of laminated dielectric layers and extending to the first end surface and the second end surface, second inner electrode layers on the plurality of laminated dielectric layers and extending to the first side surface and the second side surface, a first outer electrode on the first end surface and connected to the first inner electrode layers, a second outer electrode on the second end surface and connected to the first inner electrode layers, a third outer electrode on the first side surface and connected to the second inner electrode layers, and a fourth outer electrode on the second side surface and connected to the second inner electrode layers. The first inner electrode layers each include a first opposing portion facing the second inner electrode layers, a first extended portion extending from the first opposing portion to the first end surface, and a second extended portion extending from the first opposing portion to the second end surface. The second inner electrode layers each include a second opposing portion facing the first inner electrode layers, a first extension portion extending from the second opposing portion to the first side surface, and a second extension portion extending from the second opposing portion to the second side surface. The first extension portion is partially or entirely bent toward the second main surface, and the second extension portion is partially or entirely bent toward the second main surface.

In the multilayer ceramic capacitor according to the above-described example embodiment of the present invention, each second inner electrode layer includes the second opposing portion facing the first inner electrode layers, the first extension portion extending from the second opposing portion to the first side surface, and the second extension portion extending from the second opposing portion to the second side surface. The first extension portion is partially or entirely bent toward the second main surface, and the second extension portion is partially or entirely bent toward the second main surface. Therefore, when the multilayer ceramic capacitor is mounted on a mounting substrate, the current paths from second inner electrode layers near the upper layer (first main surface) to the mounting substrate are reduced in length.

This makes it possible to improve the low ESL characteristics of the multilayer ceramic capacitor.

A multilayer ceramic capacitor-mounted structure according an example embodiment of the present invention includes a mounting substrate, and a multilayer ceramic capacitor mounted on the mounting substrate, wherein the multilayer ceramic capacitor is a multilayer ceramic capacitor according to an example embodiment of the present invention. The mounting substrate includes a core material, a first connecting conductor on the core material and connected to a first outer electrode, a second connecting conductor on the core material and connected to a second outer electrode, a third connecting conductor on the core material and connected to a third outer electrode, and a fourth connecting conductor on the core material and connected to a fourth outer electrode. The multilayer ceramic capacitor is mounted such that the second main surface faces the mounting substrate.

In the multilayer ceramic capacitor-mounted structure according to the above-described preferred embodiment of the present invention, the current paths from the first inner electrode layers to the mounting substrate are reduced in length. Thus, the multilayer ceramic capacitor-mounted structure has improved low ESL characteristics.

According to example embodiments of the present invention, it is possible to provide multilayer ceramic capacitors and multilayer ceramic capacitor-mounted structures each achieving improved low ESL characteristics.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Example embodiments of the present invention will be described below with reference to the accompanying drawings.

1. Multilayer Ceramic Capacitor

A multilayer ceramic capacitor according to an example embodiment of the present invention will now be described.

The multilayer ceramic capacitor according to the present example embodiment may be a three-terminal multilayer ceramic capacitor, for example.

Figure 1:
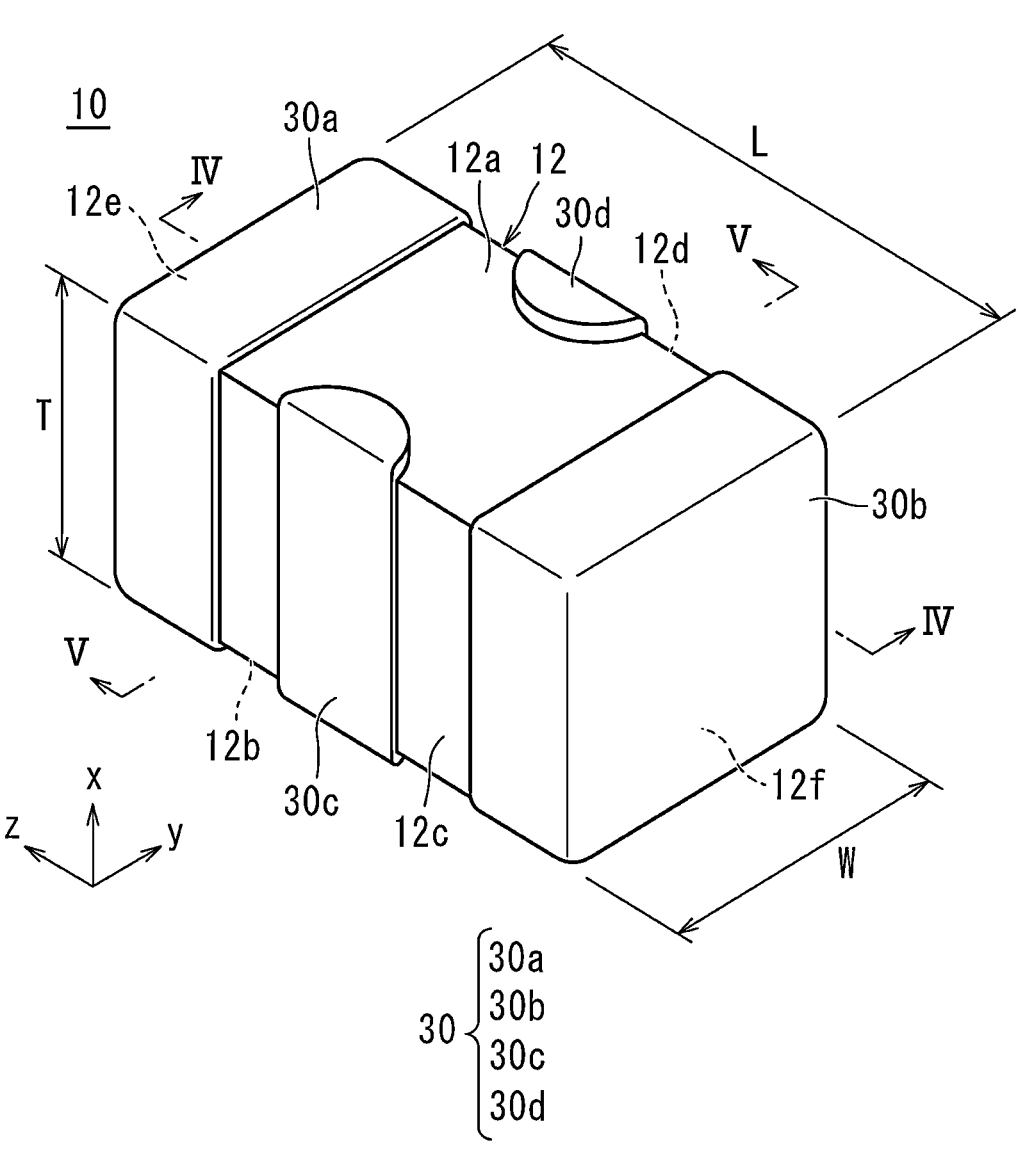
FIG. 1 is an external perspective view showing an example of a multilayer ceramic capacitor (three-terminal multilayer ceramic capacitor) according to an example embodiment of the present invention.
Figure 2:
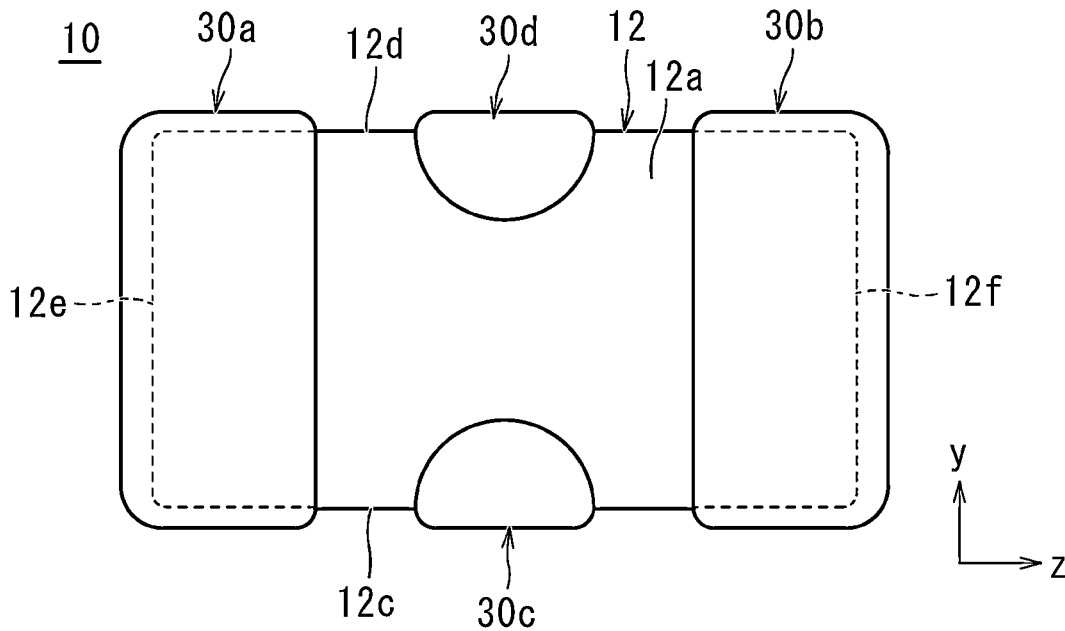
FIG. 2 is a top view showing the example of a multilayer ceramic capacitor (for example, a three-terminal multilayer ceramic capacitor) according to an example embodiment of the present invention.
Figure 3:
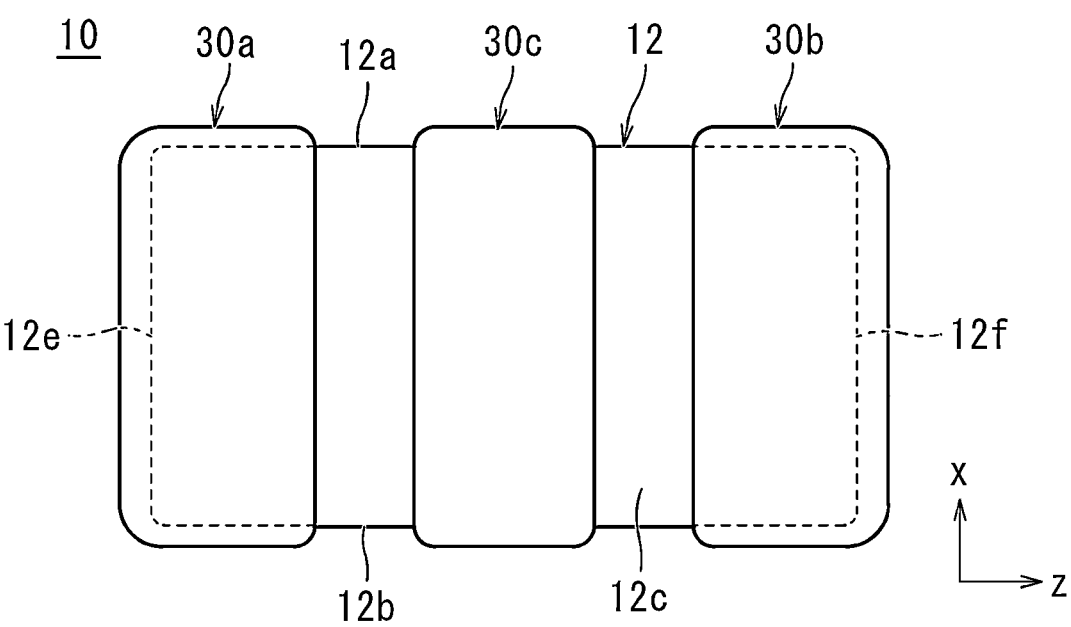
FIG. 3 is a side view showing the example of a multilayer ceramic capacitor (for example, a three-terminal multilayer ceramic capacitor) according to an example embodiment of the present invention.
Figure 4:
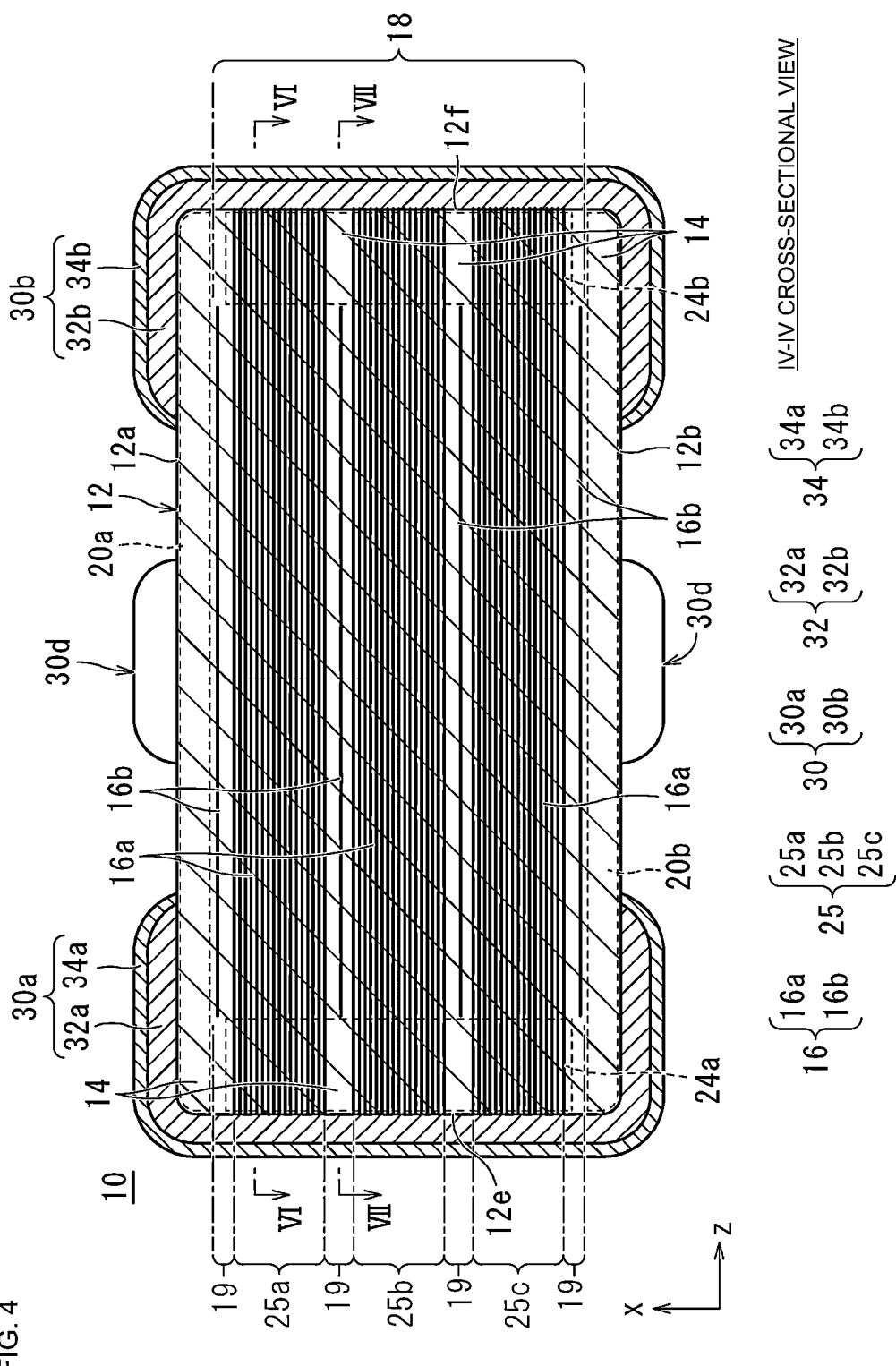
FIG. 4 is a cross-sectional view taken along line IV-IV of FIG. 1.
Figure 5:
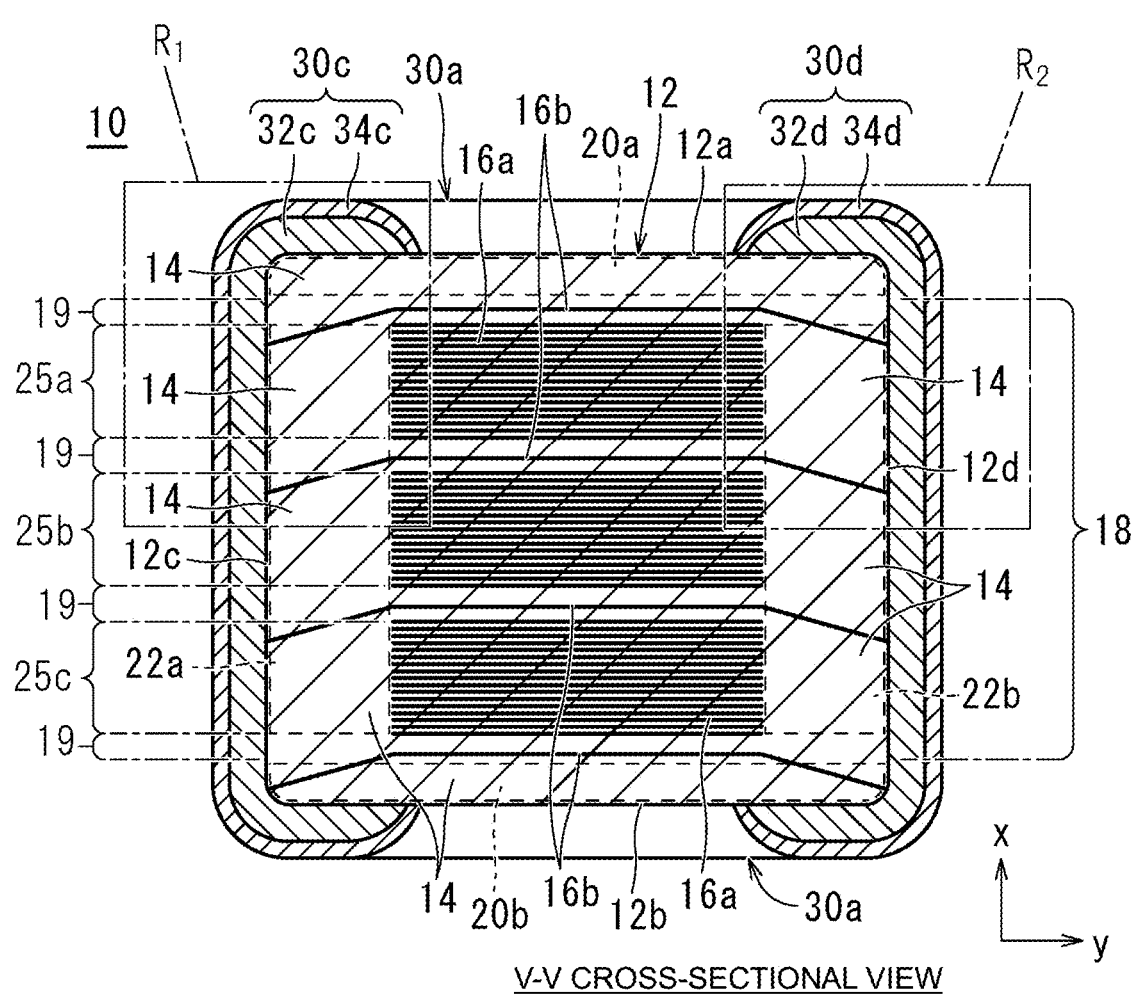
FIG. 5 is a cross-sectional view taken along line V-V of FIG. 1.
Figure 6:
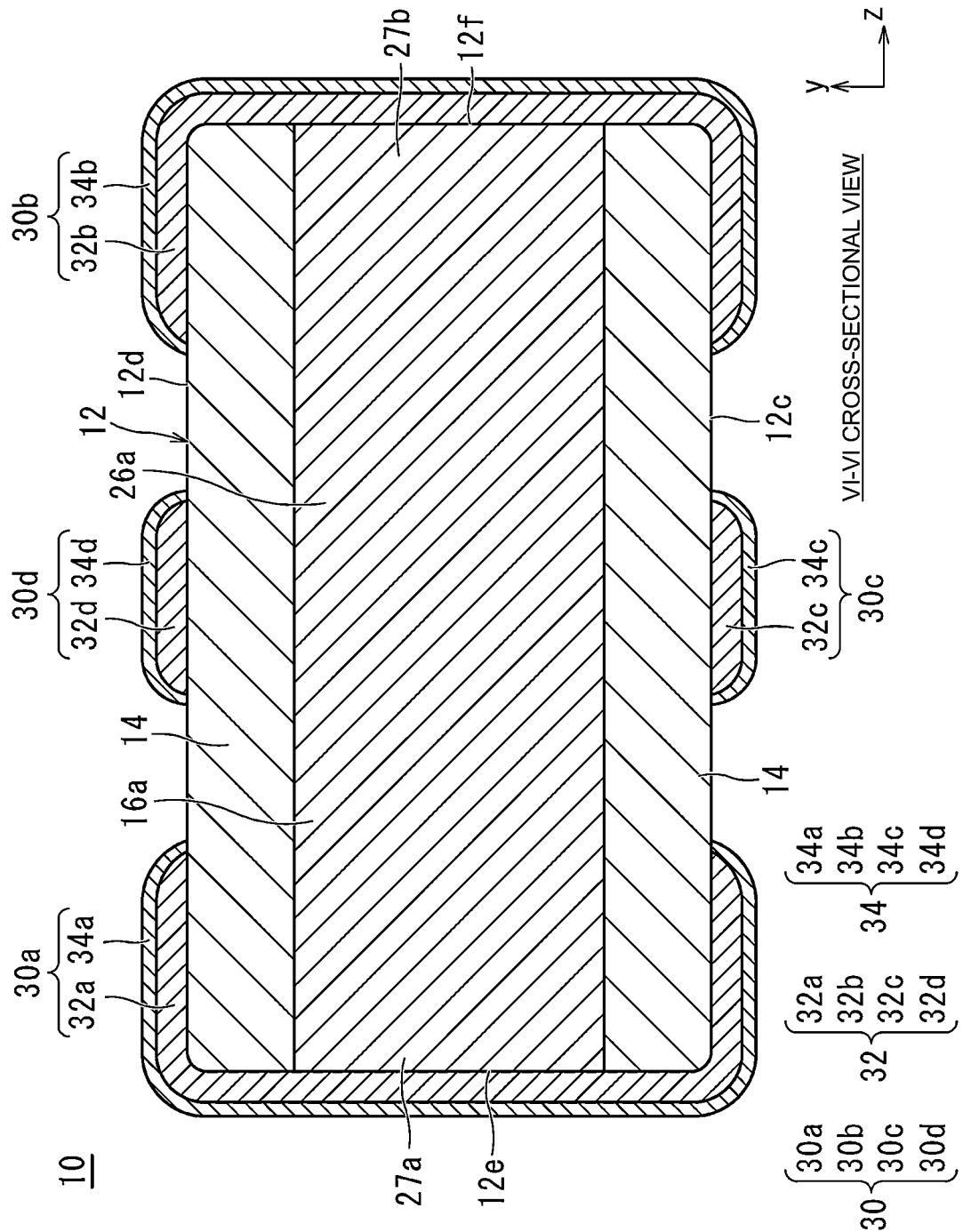
FIG. 6 is a cross-sectional view taken along line VI-VI of FIG. 4.
Figure 7:
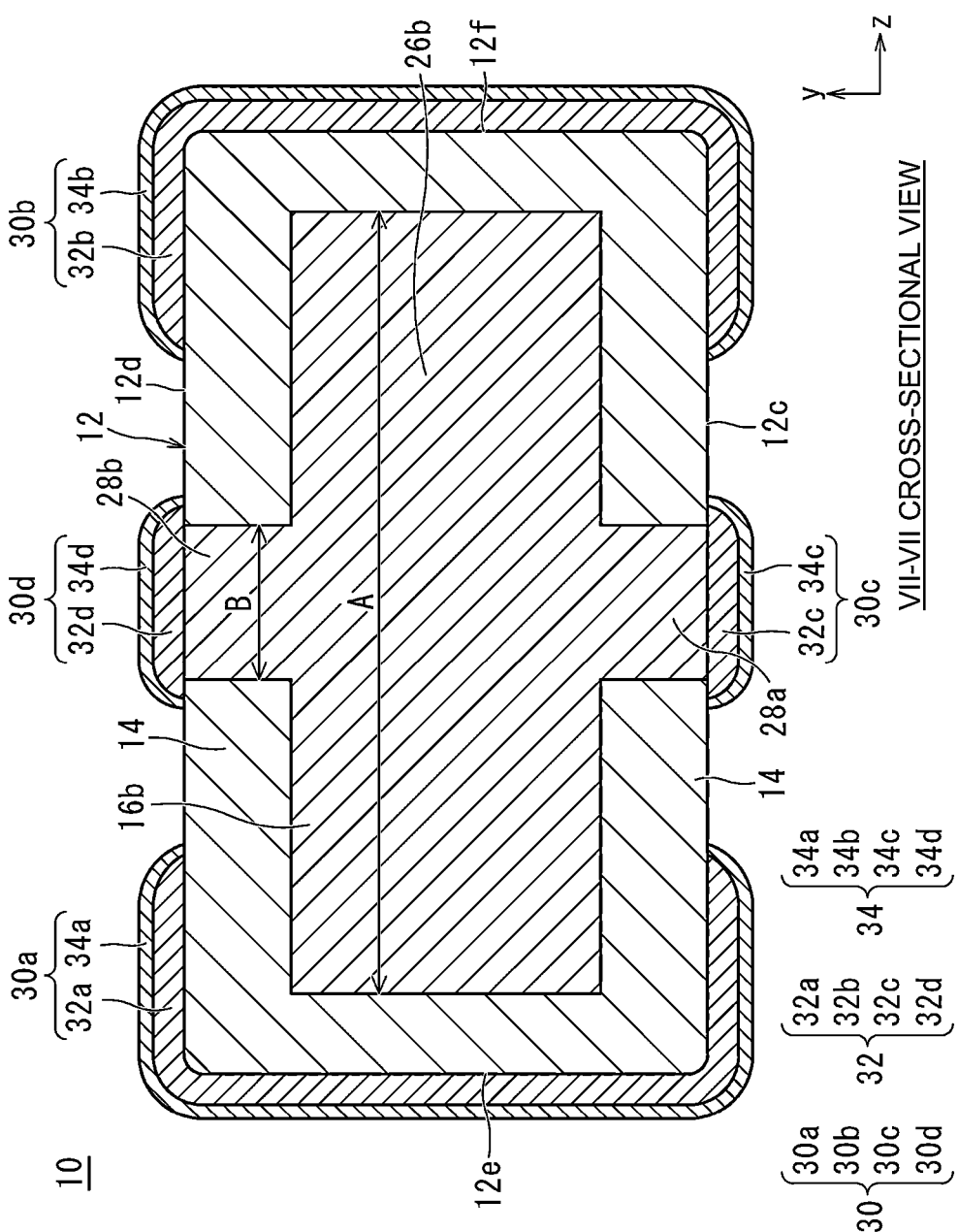
FIG. 7 is a cross-sectional view taken along line VII-VII of FIG. 4.
Figure 8:
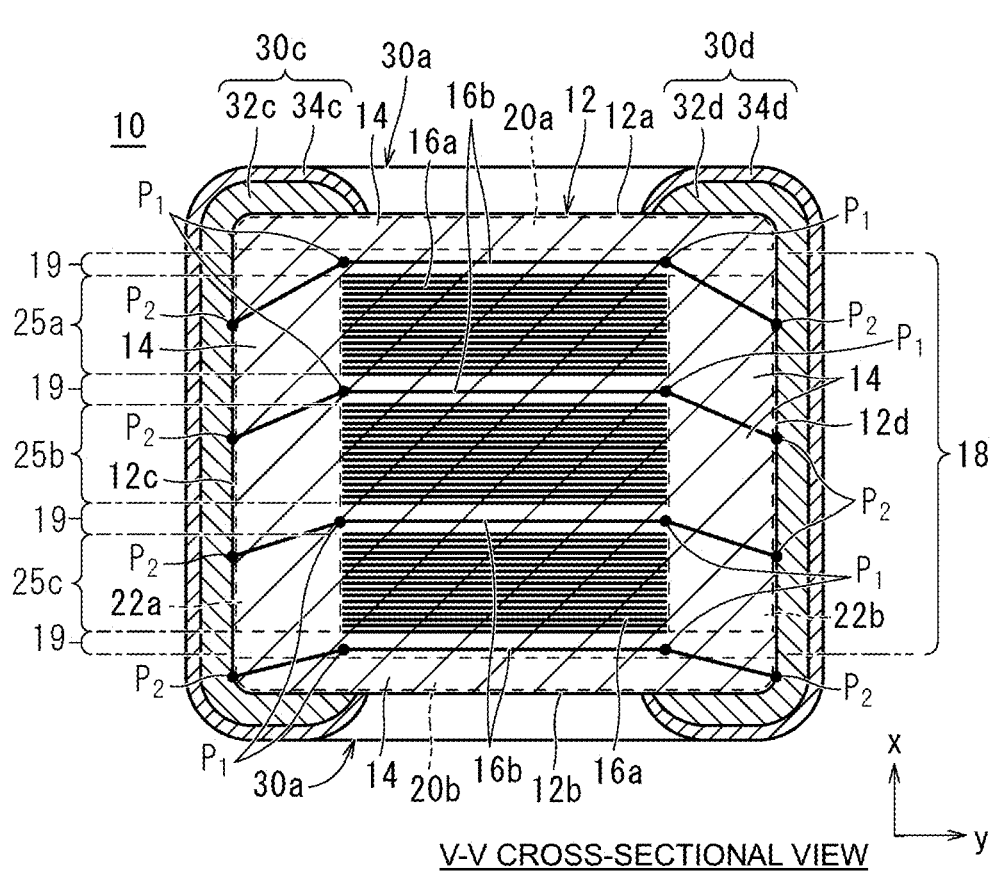
FIG. 8 shows a variation of the second inner electrode layers shown in the V-V cross-sectional view of FIG. 5.
Figure 9:
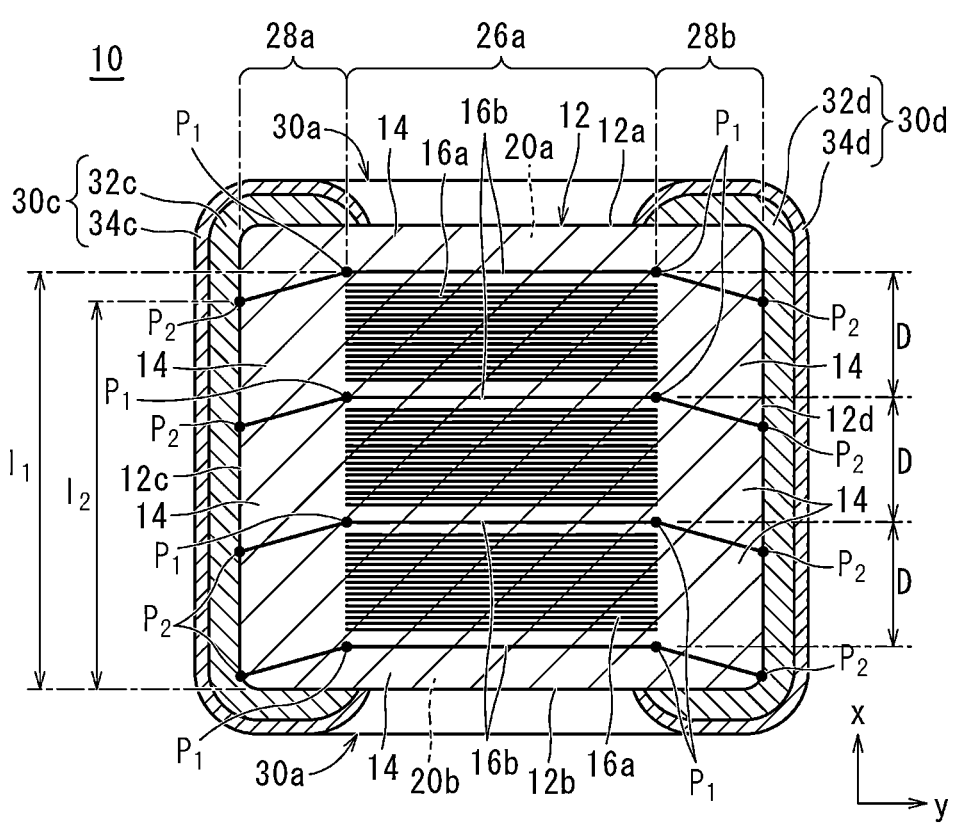
FIG. 9 is a cross-sectional view illustrating the construction shown in the V-V cross-sectional view of FIG. 5.
Figures 10A, 10B:
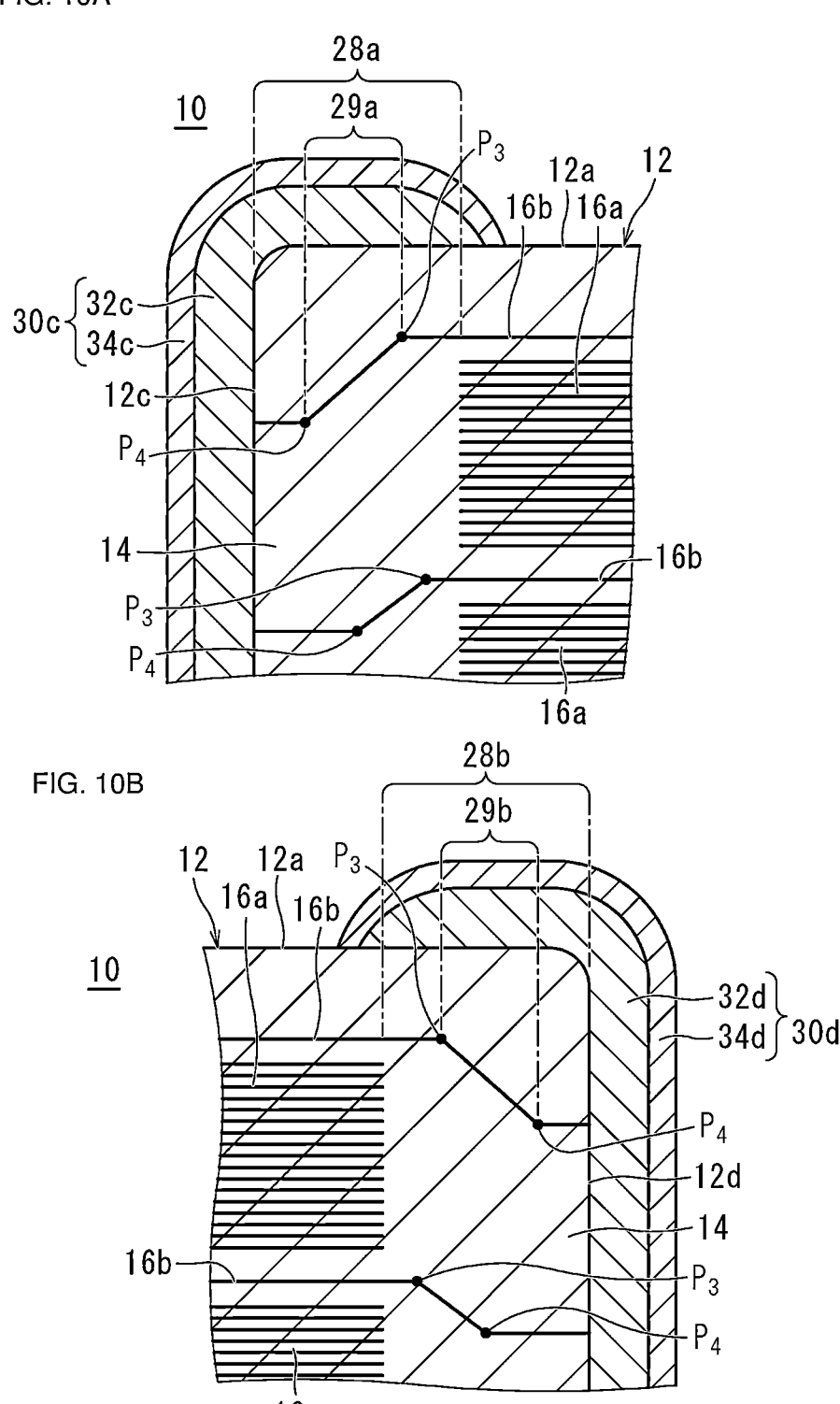
FIG. 10A is an enlarged view showing the region R1 of FIG. 5, and is a schematic cross-sectional view showing a first bent portion located in a first extension portion of a second inner electrode layer.
FIG. 10B is an enlarged view showing the region R2 of FIG. 5, and is a schematic cross-sectional view showing a second bent portion located in a second extension portion of a second inner electrode layer.

FIG. 1 is an outer perspective view showing an example of a multilayer ceramic capacitor (for example, a three-terminal multilayer ceramic capacitor) according to an example embodiment of the present invention. FIG. 2 is a top view showing the example of a multilayer ceramic capacitor (for example, a three-terminal multilayer ceramic capacitor) according to an example embodiment of the present invention. FIG. 3 is a side view showing the example of a multilayer ceramic capacitor (for example, a three-terminal multilayer ceramic capacitor) according to an example embodiment of the present invention. FIG. 4 is a cross-sectional view taken along line IV-IV of FIG. 1. FIG. 5 is a cross-sectional view taken along line V-V of FIG. 1. FIG. 6 is a cross-sectional view taken along line VI-VI of FIG. 4. FIG. 7 is a cross-sectional view taken along line VII-VII of FIG. 4. FIG. 8 shows a variation of the second inner electrode layers shown in the V-V cross-sectional view of FIG. 5. FIG. 9 is a cross-sectional view illustrating the construction shown in the V-V cross-sectional view of FIG. 5. FIG. 10A is an enlarged view showing the region R1 of FIG. 5, and is a schematic cross-sectional view showing a first bent portion located in a first extension portion of a second inner electrode layer, and FIG. 10B is an enlarged view showing the region R2 of FIG. 5, and is a schematic cross-sectional view showing a second bent portion located in a second extension portion of a second inner electrode layer.

As shown in FIGS. 1 through 3, the multilayer ceramic capacitor 10 includes, for example, a multilayer body 12 having a rectangular or substantially rectangular parallelepiped shape, and outer electrodes 30.

The multilayer body 12 includes a plurality of laminated dielectric layers 14, and a plurality of inner electrode layers 16 laminated on the dielectric layers 14. The multilayer body 12 includes a first main surface 12a and a second main surface 12b opposite to each other in the height direction x, a first side surface 12c and a second side surface 12d opposite to each other in the width direction y perpendicular or substantially perpendicular to the height direction x, and a first end surface 12e and a second end surface 12f opposite to each other in the length direction z perpendicular or substantially perpendicular to the height direction x and the width direction y. The multilayer body 12 preferably has rounded corners and ridges. A corner refers to a portion where three adjacent surfaces of the multilayer body intersect, and a ridge refers to a portion where two adjacent surfaces of the multilayer body intersect. Irregularities may be provided on a portion or the entirety of the first main surface 12a and the second main surface 12b, the first side surface 12c and the second side surface 12d, and the first end surface 12e and the second end surface 12f.

There is no particular limitation on the dimensions of the multilayer body 12.

The multilayer body 12 includes an inner layer portion 18, and a first main surface-side outer layer portion 20a and a second main surface-side outer layer portion 20b, which sandwich the inner layer portion 18 in the height direction x.

The inner layer portion 18 includes the plurality of dielectric layers 14 and the plurality of inner electrode layers 16. The inner layer portion 18 extends, in the height direction x, from an inner electrode layer 16 located closest to the first main surface 12a to an inner electrode layer 16 located closest to the second main surface 12b. In the inner layer portion 18, the inner electrode layers 16 are disposed opposite to each other with the dielectric layers 14 interposed therebetween. The inner layer portion 18 is a portion that generates a capacitance and substantially defines and functions as a capacitor.

The first main surface-side outer layer portion 20a is located on the side of the first main surface 12a. The first main surface-side outer layer portion 20a includes a plurality of dielectric layers 14 located between the first main surface 12a and the inner electrode layer 16 closest to the first main surface 12a.

The second main surface-side outer layer portion 20b is located on the side of the second main surface 12b. The second main surface-side outer layer portion 20b includes a plurality of dielectric layers 14 located between the second main surface 12b and the inner electrode layer 16 closest to the second main surface 12b.

The dielectric layers 14 used in the first main surface-side outer layer portion 20a and the second main surface-side outer layer portion 20b may be the same as the dielectric layers 14 used in the inner layer portion 18.

The multilayer body 12 includes a first side surface-side outer layer portion 22a located on the side of the first side surface 12c, and including a plurality of dielectric layers 14 located between the first side surface 12c and the first side surface 12c-side outermost surface of the inner layer portion 18.

Similarly, the multilayer body 12 includes a second side surface-side outer layer portion 22b located on the side of the second side surface 12d, and including a plurality of dielectric layers 14 located between the second side surface 12d and the second side surface 12d-side outermost surface of the inner layer portion 18.

FIG. 5 shows the range of the first side surface-side outer layer portion 22a and the range of the second side surface-side outer layer portion 22b in the width direction y. The width of the first side surface-side outer layer portion 22a and the width of the second side surface-side outer layer portion 22b in the width direction y are also referred to as a W gap or a side gap.

Further, the multilayer body 12 includes a first end surface-side outer layer portion 24a located on the side of the first end surface 12e, and including a plurality of dielectric layers 14 located between the first end surface 12e and the first end surface 12e-side outermost surface of the inner layer portion 18.

Similarly, the multilayer body 12 includes a second end surface-side outer layer portion 24b located on the side of the second end surface 12f, and including a plurality of dielectric layers 14 located between the second end surface 12f and the second end surface 12f-side outermost surface of the inner layer portion 18.

FIG. 4 shows the range of the first end surface-side outer layer portion 24a and the range of the second end surface-side outer layer portion 24b in the length direction z. The width of the first end surface-side outer layer portion 24a and the width of the second end surface-side outer layer portion 24b in the length direction z are also referred to as an L gap or an end gap.

The dielectric layers 14 can be made of a dielectric material, for example, a ceramic material. A dielectric ceramic including a component such as, for example, $BaTiO_3$, $CaTiO_3$, $SrTiO_3$, or $CaZrO_3$ can be used as such a dielectric material. When the dielectric layers 14 include the above-described dielectric material as a main component, it is possible to add thereto an accessory component (s), such as, for example, a Mn compound, a Fe compound, a Cr compound, a Co compound, or a Ni compound, in a smaller amount than the main component depending on the intended characteristics of the multilayer body 12.

The thickness of each dielectric layer 14 after firing is, for example, preferably not less than about 1.0 μm and not more than about 15 μm.

The number of the laminated dielectric layers 14 is, for example, preferably not less than 80 and not more than 200. The number of the dielectric layers 14 is the sum of the number of the dielectric layers 14 in the inner layer portion 18 and the number of the dielectric layers 14 in the first main surface-side outer layer portion 20a and the second main surface-side outer layer portion 20b.

The multilayer body 12 includes a plurality of first inner electrode layers 16a and a plurality of second inner electrode layers 16b as the plurality of inner electrode layers 16.

The first inner electrode layers 16a are disposed on dielectric layers 14.

As shown in FIG. 6, each first inner electrode layer 16a extends between the first end surface 12e and the second end surface 12f of the multilayer body 12, and includes a first opposing portion 26a facing the second inner electrode layers 16b, a first extended portion 27a extending from the first opposing portion 26a to the first end surface 12e, and a second extended portion 27b extending from the first opposing portion 26a to the second end surface 12f. The first opposing portion 26a is located on a center portion of a dielectric layer 14. The first extended portion 27a is exposed on the first end surface 12e of the multilayer body 12, and the second extended portion 27b is exposed on the second end surface 12f of the multilayer body 12. Thus, the first inner electrode layer 16a is not exposed on either the first side surface 12c or the second side surface 12d of the multilayer body 12.

While there is no particular limitation on the shape of each first inner electrode layer 16a, for example, it preferably has a rectangular or substantially rectangular shape, although its corners may be rounded.

The second inner electrode layers 16b are disposed on dielectric layers 14 which differ from the dielectric layers 14 on which the first inner electrode layers 16a are disposed.

As shown in FIG. 7, each second inner electrode layer 16b extends between the first side surface 12c and the second side surface 12d of the multilayer body 12, and includes a second opposing portion 26b facing the first inner electrode layers 16a, a first extension portion 28a extending from the second opposing portion 26b to the first side surface 12c, and a second extension portion 28b extending from the second opposing portion 26b to the second side surface 12d. The second opposing portion 26b has a rectangular or substantially rectangular shape which extends in a direction toward the first end surface 12e and in a direction toward the second end surface 12f. The second opposing portion 26b is located on a center portion of a dielectric layer 14. The first extension portion 28a is exposed on the first side surface 12c of the multilayer body 12, and the second extension portion 28b is exposed on the second side surface 12d of the multilayer body 12. Thus, the second inner electrode layer 16b is not exposed on either the first end surface 12e or the second end surface 12f of the multilayer body 12.

While there is no particular limitation on the shapes of the second opposing portion 26b, the first extension portion 28a, and the second extension portion 28b of each second inner electrode layer 16b, for example, they preferably have a rectangular or substantially rectangular shape, although its corners may be rounded.

In each second inner electrode layer 16b, the width A of the second opposing portion 26b in the length direction z connecting the first end surface 12e and the second end surface 12f is preferably equal to or greater than the width B of each of the first extension portion 28a and the second extension portion 28b in the length direction z connecting the first end surface 12e and the second end surface 12f, i.e., A≥B.

The first opposing portion 26a of each first inner electrode layer 16a and the second opposing portion 26b of each second inner electrode layer 16b face each other.

The width of the first opposing portion 26a of each first inner electrode layer 16a in the width direction y connecting the first side surface 12c and the second side surface 12d may be equal to or different from the width of the second opposing portion 26b of each second inner electrode layer 16b in the width direction y connecting the first side surface 12c and the second side surface 12d.

The number of the first inner electrode layers 16a is greater than the number of the second inner electrode layers 16b, and two or more first inner electrode layers 16a are laminated successively. Thus, in the multilayer ceramic capacitor 10 shown in FIG. 1, the number of the first inner electrode layers 16a is large and the number of first inner electrode layers 16a connected in parallel is large and, in addition, electrical conduction between the first inner electrode layers 16a and the outer electrodes 30 is increased. This makes it possible to reduce or prevent an increase in DC resistance while reducing or preventing an increase in capacitance.

The total number of the first inner electrode layers 16a and the second inner electrode layers for example, preferably not less than 50 and not more than 150.

The number of the first inner electrode layers 16a is not particularly limited. For example, it is preferably not less than 49 and not more than 100.

The number of the second inner electrode layers 16b is not particularly limited. For example, it is preferably not less than 2 and not more than 50.

The thickness of each first inner electrode layer 16a is not particularly limited. For example, it is preferably not less than about 0.5 μm and not more than about 1.1 μm.

The thickness of each second inner electrode layer 16b is not particularly limited; for example, it is preferably not less than about 0.5 μm and not more than about 1.1 μm.

Preferably, the same number of first inner electrode layers 16a is successively laminated between any two adjacent inner electrode layers 16b so that the distances between adjacent inner electrode layers 16b are equal or substantially equal, although the present invention is not limited to this feature.

The inner layer portion 18 of the multilayer body 12 includes capacitance forming portions 19, where first inner electrode layers 16a and a second inner electrode layer (s) 16b face each other via a dielectric layer 14 to generate a capacitance, and inner electrode laminated portions 25 which are each a region where two or more first inner electrode layers 16a are successively laminated. The capacitor characteristics of the multilayer ceramic capacitor 10 are defined by the capacitance forming portions 19.

The inner electrode laminated portions 25 are separated by second inner electrode layers 16b. By thus distributing the assemblies of the first inner electrode layers 16a, the heat dissipation effect can be improved, making it possible to achieve the advantageous effect of reducing the increase in temperature.

In the multilayer ceramic capacitor 10 shown in FIG. 1, the inner electrode laminated portions 25 are separated by two second inner electrode layers 16b, and include a first inner electrode laminated portion 25a, a second inner electrode laminated portion 25b, and a third inner electrode laminated portion 25c, as shown in FIG. 4.

The second inner electrode layers 16b, which are disposed such that they separate the inner electrode laminated portions 25 which are each a region where two or more first inner electrode layers 16a are successively laminated, may each include a single layer or a two or more layers successively laminated.

A second inner electrode layer (s) 16b may be disposed between the inner electrode laminated portion 25 which is a region where two or more first inner electrode layers 16a are successively laminated, located on the side of the first main surface 12a of the multilayer body 12, namely the first inner electrode laminated portion 25a, and the first main surface 12a, and between the inner electrode laminated portion 25 which is a region where two or more first inner electrode layers 16a are successively laminated, located on the side of the second main surface 12b of the multilayer body 12, namely the third inner electrode laminated portion 25c, and the second main surface 12b. This enables the formation of capacitance forming portions 19 also in the vicinities of the first main surface-side outer layer portion 20a and the second main surface-side outer layer portion 20b, so that a portion of the capacitance is obtained. Therefore, the current path to a mounting substrate can be shortened and the low ESL effect can be achieved.

Nevertheless, a second inner electrode layer (s) 16b need not be provided between the inner electrode laminated portion 25 which is a region where two or more first inner electrode layers 16a are successively laminated, located on the side of the first main surface 12a of the multilayer body 12, namely the first inner electrode laminated portion 25a, and the first main surface 12a, or between the inner electrode laminated portion 25 which is a region where two or more first inner electrode layers 16a are successively laminated, located on the side of the second main surface 12b of the multilayer body 12, namely the third inner electrode laminated portion 25c, and the second main surface 12b.

The first extension portion 28a of each second inner electrode layer 16b is partially or entirely bent toward the second main surface 12b. Similarly, the second extension portion 28b of each second inner electrode layer 16b is partially or entirely bent toward the second main surface 12b.

When the multilayer ceramic capacitor 10 is mounted on a mounting substrate such that the second main surface 12b of the multilayer body 12 faces a mounting surface, the distance of the mounting surface from the first extension portion 28a of each second inner electrode layer 16b and from the second extension portion 28b of each second inner electrode layer 16b can be shortened. Therefore, the current path can be shortened and the ESL can be reduced.

More preferably, as shown in FIG. 8, the degree of bending of the first extension portion 28a of each second inner electrode layer 16b decreases with a decrease in the distance of the first extension portion 28a to the second main surface 12b. Similarly, the degree of bending of the second extension portion 28b of each second inner electrode layer 16b preferably decreases with a decrease in the distance of the second extension portion 28b to the second main surface 12b.

By gradually decreasing the degree of bending, it becomes possible to avoid a local decrease in close contact, thus preventing a structural defect in the extension portions.

The degree of bending is herein defined by the following equation:

$$\text{Degree of bending} = l_1 - l_2/l_1$$

where, as shown in FIG. 9, $l_1$ is the distance of a boundary point $P_1$ between the second opposing portion 26*b* and the first extension portion 28*a* or a boundary point $P_1$ between the second opposing portion 26*b* and the second extension portion 28*b* from the second main surface 12*b* (hereinafter simply referred to as distance $l_1$), and $l_2$ is the distance of an exposed point P2 on the first extension portion 28*a*, extended to the side surface, from the second main surface (hereinafter simply referred to as distance $l_2$).

The degree of bending is, for example, preferably about 0.12 or less. When the degree of bending is more than about 0.12, a decrease in close contact is likely to occur, causing a structural defect such as a void.

In each second inner electrode layer 16*b*, the first extension portion 28*a* includes a first bent portion 29*a*, and the second extension portion 28*b* includes a second bent portion 29*b*.

The first bent portion 29*a* and the second bent portion 29*b* will now be described with reference to the enlarged view of FIGS. 10A and 10B, showing the region R1 and the region R2 of FIG. 5.

As shown in FIG. 10A, in the first extension portion 28*a*, the first bent portion 29*a* is defined as the range between a bend start point $P_3$ and a bend end point $P_4$. The bend start point $P_3$ is defined as a point at which the first extension portion 28*a* begins to bend toward the second main surface 12*b*, while the bend end point $P_4$ is defined as a point at which the first extension portion 28*a* ceases to bend.

As shown in FIG. 10B, in the second extension portion 28*b*, the second bent portion 29*b* is defined as the range between a bend start point $P_3$ and a bend end point $P_4$. The bend start point $P_3$ is defined as a point at which the second extension portion 28*b* begins to bend toward the second main surface 12*b*, while the bend end point $P_4$ is defined as a point at which the second extension portion 28*b* ceases to bend.

The bend start point $P_3$ on the first extension portion 28*a* may be disposed such that it is closer to the second opposing portion 26*b* when it is nearer to the second main surface 12*b*. Similarly, the bend start point $P_3$ on the second extension portion 28*b* may be disposed such that it is closer to the first opposing portion 26*a* when it is nearer to the second main surface 12*b*.

The bend end point $P_4$ on the first extension portion 28*a* may be disposed such that it is closer to the second opposing portion 26*b* when it is nearer to the second main surface 12*b*. Similarly, the bend end point $P_4$ on the second extension portion 28*b* may be disposed such that it is closer to the second opposing portion 26*b* when it is nearer to the second main surface 12*b*.

Preferably, the length of the first bent portion 29*a* is shorter when it is nearer to the second main surface 12*b*. Similarly, the length of the second bent portion 29*b* is preferably shorter when it is nearer to the second main surface 12*b*.

In the second inner electrode layers 16*b* which are disposed such that adjacent layers 16*b* sandwich first inner electrode layers 16*a* in the height direction x of the multilayer body 12, the distance D in the height direction x between the second opposing portion 26*b* of any second inner electrode layer 16*b* and the second opposing portion 26*b* of the nearest other second inner electrode layer 16*b* (hereinafter simply referred to as the distance D) is, for example, preferably not less than about 0.008 mm and not more than about 0.54 mm.

When the distance D is less than about 0.008 mm, the degree of bending is low, and therefore the current path of a GND electrode area, located near the upper outer layer, to a substrate is long. Accordingly, it is sometimes difficult to achieve a low ESL. On the other hand, when the distance D is more than about 0.54 mm, a decrease of close contact is likely to occur, causing a structural defect such as a void.

For measurements of the geometric features described above, in particular, measurement of the distance $l_1$ and the distance $l_2$ to calculate the degree of bending, confirmation of the position of the bend start point $P_3$ and the position of the bend end point $P_4$, and measurement of the distance D, the multilayer body 12 is cut to about ½ L in the length direction z to expose a WT cross-section, and the WT cross-section is observed using a microscope (e.g., VHX Series manufactured by Keyence Corporation).

The first inner electrode layers 16*a* and the second inner electrode layers 16*b* can be made of any appropriate conductive material, for example, a metal such as Ni, Cu, Ag, Pd, or Au, or an alloy containing at least one of these metals, such as an Ag—Pd alloy.

The outer electrodes 30 are disposed on the first end surface 12*e* side, the second end surface 12*f* side, the first side surface 12*c* side and the second side surface 12*d* side of the multilayer body 12. The outer electrodes 30 include a first outer electrode 30*a*, a second outer electrode 30*b*, a third outer electrode 30*c*, and a fourth outer electrode 30*d*.

The first outer electrode 30*a* is disposed on the first end surface 12*e* of the multilayer body 12. The first outer electrode 30*a* extends from the first end surface 12*e* of the multilayer body 12 such that it covers a portion of the first main surface 12*a*, a portion of the second main surface 12*b*, a portion of the first side surface 12*c*, and a portion of the second side surface 12*d*. The first outer electrode 30*a* is electrically connected to the first extended portions 27*a* of the first inner electrode layers 16*a*, exposed on the first end surface 12*e* of the multilayer body 12. However, the first outer electrode 30*a* may be disposed only on the first end surface 12*e* of the multilayer body 12.

The second outer electrode 30*b* is disposed on the second end surface 12*f* of the multilayer body 12. The second outer electrode 30*b* extends from the second end surface 12*f* of the multilayer body 12 such that it covers a portion of the first main surface 12*a*, a portion of the second main surface 12*b*, a portion of the first side surface 12*c*, and a portion of the second side surface 12*d*. The second outer electrode 30*b* is electrically connected to the second extended portions 27*b* of the first inner electrode layers 16*a*, exposed on the second end surface 12*f* of the multilayer body 12. However, the second outer electrode 30*b* may be disposed only on the second end surface 12*f* of the multilayer body 12.

The third outer electrode 30*c* is disposed on the first side surface 12*c* of the multilayer body 12. The third outer electrode 30*c* extends from the first side surface 12*c* such that it covers a portion of the first main surface 12*a* and a portion of the second main surface 12*b*. The third outer electrode 30*c* is electrically connected to the first extension portions 28*a* of the second inner electrode layers 16*b*, exposed on the first side surface 12*c* of the multilayer body 12. However, the third outer electrode 30*c* may be disposed only on the first side surface 12*c* of the multilayer body 12.

The fourth outer electrode 30*d* is disposed on the second side surface 12*d* of the multilayer body 12. The fourth outer electrode 30*d* extends from the second side surface 12*d* such that it covers a portion of the first main surface 12*a* and a portion of the second main surface 12*b*. The fourth outer electrode 30*d* is electrically connected to the second extension portions 28*b* of the second inner electrode layers 16*b*, exposed on the second side surface 12*d* of the multilayer body 12. However, the fourth outer electrode 30*d* may be disposed only on the second side surface 12*d* of the multilayer body 12.

The outer electrodes 30 preferably include a base electrode layer 32 on the surface of the multilayer body 12, and a plating layer 34 covering the base electrode layer 32.

The base electrode layer 32 includes a first base electrode layer 32*a*, a second base electrode layer 32*b*, a third base electrode layer 32*c*, and a fourth base electrode layer 32*d*.

The first base electrode layer 32*a* is disposed on the first end surface 12*e* of the multilayer body 12, and extends from the first end surface 12*e* such that it covers a portion of the first main surface 12*a*, a portion of the second main surface 12*b*, a portion of the first side surface 12*c*, and a portion of the second side surface 12*d*.

The second base electrode layer 32*b* is disposed on the second end surface 12*f* of the multilayer body 12, and extends from the second end surface 12*f* such that it covers a portion of the first main surface 12*a*, a portion of the second main surface 12*b*, a portion of the first side surface 12*c*, and a portion of the second side surface 12*d*.

However, the first base electrode layer 32*a* may be disposed only on the first end surface 12*e* of the multilayer body 12, and the second base electrode layer 32*b* may be disposed only on the second end surface 12*f* of the multilayer body 12.

The third base electrode layer 32*c* is disposed on the first side surface 12*c* of the multilayer body 12, and extends from the first side surface 12*c* such that it covers a portion of the first main surface 12*a* and a portion of the second main surface 12*b*.

The fourth base electrode layer 32*d* is disposed on the second side surface 12*d* of the multilayer body 12, and extends from the second side surface 12*d* such that it covers a portion of the first main surface 12*a* and a portion of the second main surface 12*b*.

However, the third base electrode layer 32*c* may be disposed only on the first side surface 12*c* of the multilayer body 12, and the fourth base electrode layer 32*d* may be disposed only on the second side surface 12*d* of the multilayer body 12.

The base electrode layer 32 includes at least one selected from a baked layer, a conductive resin layer, and a thin film layer.

The construction of the base electrode layer 32 in the case where the baked layer, the conductive resin layer, or the thin film layer is used for the base electrode layer 32 will now be described.

In the Case of Baked Layer

The baked layer includes a glass component and a metal component. The glass component of the baked layer includes, for example, at least one B, Si, Ba, Mg, Al, Li, etc. The metal component of the baked layer includes, for example, at least one of Cu, Ni, Ag, Pd, an Ag—Pd alloy, or Au. The baked layer may include multiple layers. The baked layer is formed by applying a conductive paste containing a glass component and a metal component to the multilayer body 12, and baking the paste. For example, the baked layer may be one obtained by simultaneously firing a laminated chip, having the inner electrode layers 16 and the dielectric layers 14, and a conductive paste applied to the laminated chip, or one obtained by firing a laminated chip, having the inner electrode layers 16 and the dielectric layers 14, to obtain the multilayer body 12, and then applying a conductive paste to the multilayer body 12, followed by baking of the paste. In the case where the baked layer is formed by simultaneously firing a laminated chip, having the inner electrode layers 16 and the dielectric layers 14, and a conductive paste applied to the laminated chip, the conductive paste preferably includes a dielectric material instead of a glass component.

The thickness of the first base electrode layer 32*a* located on the first end surface 12*e*, at its center in the height direction x, in the direction connecting the first end surface 12*e* and the second end surface 12*f* is, for example, preferably not less than about 20 μm and not more than about 50 μm.

The thickness of the second base electrode layer 32*b* located on the second end surface 12*f*, at its center in the height direction x, in the direction connecting the first end surface 12*e* and the second end surface 12*f* is, for example, preferably not less than about 20 μm and not more than about 50 μm.

When the base electrode layer 32 is provided on a portion of the first main surface 12*a*, a portion of the second main surface 12*b*, a portion of the first side surface 12*c*, and a portion of the second side surface 12*d*, the thickness of the first base electrode layer 32*a* located on the first main surface 12*a*, the second main surface 12*b*, the first side surface 12*c* and the second side surface 12*d*, at its center in the length direction z, in the height direction x connecting the first main surface 12*a* and the second main surface 12*b* is, for example, preferably not less than about 5 μm and not more than about 20 μm.

When the base electrode layer 32 is provided on a portion of the first main surface 12*a*, a portion of the second main surface 12*b*, a portion of the first side surface 12*c*, and a portion of the second side surface 12*d*, the thickness of the second base electrode layer 32*b* located on the first main surface 12*a*, the second main surface 12*b*, the first side surface 12*c* and the second side surface 12*d*, at its center in the length direction z, in the height direction x connecting the first main surface 12*a* and the second main surface 12*b* is, for example, preferably not less than about 5 μm and not more than about 20 μm.

In the Case of Conductive Resin Layer

The conductive resin layer may include multiple layers.

The conductive resin layer may be disposed on the baked layer such that it covers the baked layer, or may be disposed directly on the multilayer body 12.

The conductive resin layer includes, for example, a thermosetting resin and a metal.

The conductive resin layer may completely cover the base electrode layer 32, or may cover a portion of the base electrode layer 32.

Since the conductive resin layer includes the thermosetting resin, it is more flexible than a conductive layer made of, for example, a plating film or a fired conductive paste. Therefore, even when a physical shock or a shock due to a thermal cycle is applied to the multilayer ceramic capacitor 10, the conductive resin layer can define and function as a buffer layer and prevent cracking of the multilayer ceramic capacitor 10.

For example, Ag, Cu, Ni, Sn, Bi, or an alloy containing such an element can be used as the metal included in the conductive resin layer.

Metal powder whose surface is coated with Ag can also be used. When Ag-coated metal powder is used, it is preferred to use, for example, powder of Cu, Ni, Sn, Bi, or an alloy thereof as the metal powder. The reason why Ag-coated metal powder is used as a conductive metal is that Ag has the lowest specific resistance among metals, and therefore is suitable for use as an electrode material, and that Ag is a noble metal, and therefore is non-oxidizable and has high weathering resistance. In addition, the use of Ag-coated metal powder enables the use of an inexpensive base metal while maintaining the above-described properties of Ag.

For example, Cu or Ni, which has been subjected to an oxidation prevention treatment, can also be used as the metal included in the conductive resin layer.

Metal powder whose surface is coated with Sn, Ni or Cu, for example, can also be used as the metal included in the conductive resin layer. When metal powder coated with Sn, Ni or Cu is used, for example, it is preferred to use powder of Ag, Cu, Ni, Sn, Bi, or an alloy thereof as the metal powder.

The average particle size of the metal included in the conductive resin layer is not particularly limited. The average particle size of the conductive filler may be, for example, not less than about 0.3 μm and not more than about 10 μm.

The metal included in the conductive resin layer contributes mainly to the conductivity of the conductive resin layer. More specifically, a current path is provided within the conductive resin layer through contact between conductive filler particles.

The metal included in the conductive resin layer may have, for example, a spherical shape or a flat shape. It is preferred to use a mixture of spherical-shaped metal powder and flat-shaped metal powder.

Various known thermosetting resins, such as, for example, an epoxy resin, a phenol resin, a urethane resin, a silicone resin, and a polyimide resin, can be used as the resin of the conductive resin layer. Among these, an epoxy resin, which has excellent heat resistance, moisture resistance, adhesion, etc., is one of the more preferable resins.

The conductive resin layer preferably contains, for example, a curing agent together with the thermosetting resin. When an epoxy resin is used as the base resin, various known compounds such as, for example, a phenol, an amine, an acid anhydride, an imidazole, an active ester, and an amide-imide can be used as a curing agent for the epoxy resin.

The thickness of each of the conductive resin layers located on the first end surface 12e and the second end surface 12f, at its center (the thickest portion) in the height direction x of the multilayer body 12 is, for example, preferably not less than about 20 μm and not more than about 70 μm.

In the Case of Thin Film Layer

In the case where the thin film layer is provided for the base electrode layer 32, the thin film layer is formed by a thin film-forming method such as, for example, a sputtering method or a vapor deposition method, and is a layer having a thickness of, for example, about 1 μm or less and including deposited metal particles.

The plating layer 34 includes a first plating layer 34a, a second plating layer 34b, a third plating layer 34c, and a fourth plating layer 34d.

The first plating layer 34a, the second plating layer 34b, the third plating layer 34c, and the fourth plating layer 34d include, for example, at least one of Cu, Ni, Sn, Ag, Pd, an Ag—Pd alloy, or Au.

The first plating layer 34a is disposed such that it covers the first base electrode layer 32a.

The second plating layer 34b is disposed such that it covers the second base electrode layer 32b.

The third plating layer 34c is disposed such that it covers the third base electrode layer 32c.

The fourth plating layer 34d is disposed such that it covers the fourth base electrode layer 32d.

The plating layer 34 may include multiple layers. In that case, the plating layer 34 preferably has a two-layer structure including, for example, a lower plating layer made of Ni plating on the base electrode layer 32, and an upper plating layer made of Sn plating on the lower plating layer.

Thus, the first plating layer 34a includes a first lower plating layer, and a first upper plating layer located on the surface of the first lower plating layer.

The second plating layer 34b includes a second lower plating layer, and a second upper plating layer located on the surface of the second lower plating layer.

The third plating layer 34c includes a third lower plating layer, and a second upper plating layer located on the surface of the third lower plating layer.

The fourth plating layer 34d includes a fourth lower plating layer, and a second upper plating layer located on the surface of the fourth lower plating layer.

The lower Ni plating layer is used to prevent the base electrode layer 32 from being corroded by solder during mounting of the multilayer ceramic capacitor 10. The upper Sn plating layer is used to improve the wettability of solder during mounting of the multilayer ceramic capacitor 10, thus facilitating its mounting.

The thickness of one layer of the plating layer is, for example, preferably not less than about 1.0 μm and not more than about 6.0 μm.

When the plating layer 34 has a three-layer structure, it preferably includes, for example, a lower plating layer made of Sn plating on the base electrode layer 32, an intermediate plating layer made of Ni plating on the lower plating layer, and an upper plating layer made of Sn plating on the intermediate plating layer.

An outer electrode (s) 30 may include only a plating layer without including the base electrode layer 32.

A structure in which only a plating layer is provided without the base electrode layer 32 will be described below, although the structure is not shown diagrammatically.

For some or all of the first outer electrode 30a to the fourth outer electrode 30d, a plating layer may be provided directly on the surface of the multilayer body 12 without the base electrode layer 32. Thus, the multilayer ceramic capacitor 10 may have a structure including the plating layer electrically connected to the first inner electrode layers 16a and the second inner electrode layers 16b. In such a case, the plating layer may be formed after performing a pretreatment of applying a catalyst to the surface of the multilayer body 12.

When the plating layer is provided directly on the multilayer body 12 without the base electrode layer 32, the elimination of the thickness of the base electrode layer 32 can reduce the height or thickness of the multilayer ceramic capacitor 10, or can increase the thickness of the multilayer body 12, i.e. the thickness of the inner layer portion 18. This can increase the degree of freedom in the design of a thin chip.

The plating layer preferably includes a lower plating electrode on the surface of the multilayer body 12, and an upper plating electrode on the surface of the lower plating electrode. The lower plating electrode and the upper plating electrode each preferably include, for example, at least one metal selected from Cu, Ni, Sn, Pb, Au, Ag, Pd, Bi, and Zn, or an alloy containing the metal(s).

For example, the lower plating electrode is preferably made using Ni, which has a solder barrier property, while the upper plating electrode is preferably made using Sn or Au, which has good solder wettability.

When, for example, the first inner electrode layers 16a and the second inner electrode layers 16b are made using Ni, the lower plating electrode is preferably made using Cu, which has good bondability to Ni. The upper plating electrode may be provided as necessary. The first outer electrode 30a to the fourth outer electrode 30d may each include only the lower plating electrode. The plating layer may include the upper plating electrode as the outermost layer, or may include another plating electrode on the surface of the upper plating electrode.

In the case where an outer electrode (s) 30 includes only the plating layer without the base electrode layer 32, the thickness of one layer of the plating layer, disposed without the base electrode layer 32, is, for example, preferably not less than about 1 μm and not more than about 15 μm.

The plating layer preferably does not include glass. The proportion of metal per unit volume of the plating layer is, for example, preferably about 99% by volume or more.

The dimension in the length direction z of the multilayer ceramic capacitor 10, including the multilayer body 12 and the first outer electrode 30a to the fourth outer electrode 30d, is represented by dimension L, the dimension in the height direction x of the multilayer ceramic capacitor 10, including the multilayer body 12 and the first outer electrode 30a to the fourth outer electrode 30d, is represented by dimension T, and the dimension in the width direction y of the multilayer ceramic capacitor 10, including the multilayer body 12 and the first outer electrode 30a to the fourth outer electrode 30d, is represented by dimension W.

There is no particular limitation on the dimensions of the multilayer ceramic capacitor 10. For example, the dimension L in the length direction z may be not less than about 1.0 mm and not more than about 1.6 mm, the dimension W in the width direction y may be not less than about 0.5 mm and not more than about 0.8 mm, and the dimension T in the height direction x may be not less than about 0.3 mm or and not more than about 0.6 mm. The dimensions of the multilayer ceramic capacitor 10 can be measured by a microscope.

In the multilayer ceramic capacitor 10 shown in FIG. 1, each second inner electrode layer 16b includes the second opposing portion 26b facing the first inner electrode layers 16a, the first extension portion 28a extending from the second opposing portion 26b to the first side surface 12c, and the second extension portion 28b extending from the second opposing portion 26b to the second side surface 12d. The first extension portion 28a is partially or entirely bent toward the second main surface 12b, and the second extension portion 28b is partially or entirely bent toward the second main surface 12b. Therefore, when the multilayer ceramic capacitor 10 is mounted on a mounting substrate, the current paths from second inner electrode layers 16b near the upper layer (first main surface 12a) to the mounting substrate can be reduced in length.

This makes it possible to improve the low ESL characteristics of the multilayer ceramic capacitor.

2. Multilayer Ceramic Capacitor-Mounted Structure

A multilayer ceramic capacitor-mounted structure 50, which is an example of a multilayer ceramic electronic component according to the first example embodiment of the present invention, will now be described.

Figure 11:
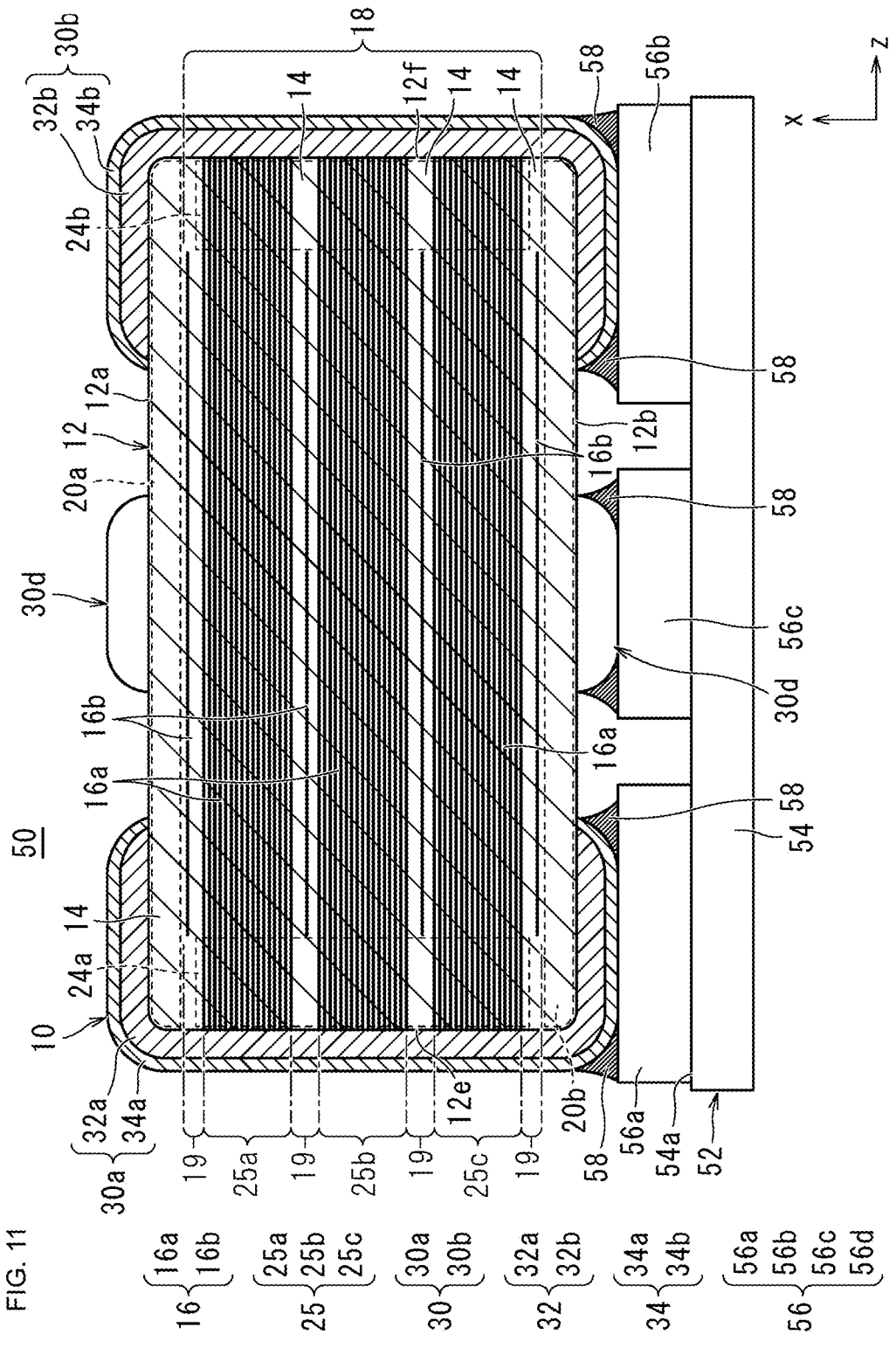
FIG. 11 is an LT cross-sectional view showing an example of a multilayer ceramic capacitor-mounted structure according to an example embodiment of the present invention.
Figure 12:
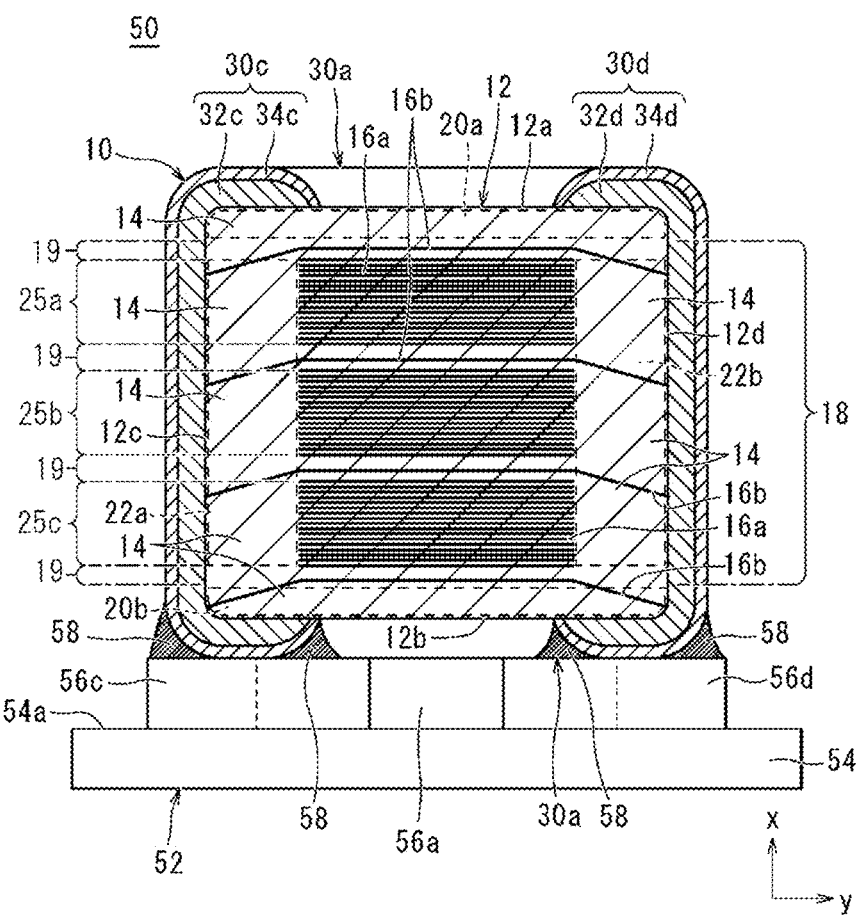
FIG. 12 is a WT cross-sectional view showing the example of a multilayer ceramic capacitor-mounted structure according to an example embodiment of the present invention.

FIG. 11 is an LT cross-sectional view showing an example of a multilayer ceramic capacitor-mounted structure according to an example embodiment of the present invention. FIG. 12 is a WT cross-sectional view showing the example of a multilayer ceramic capacitor-mounted structure according to an example embodiment of the present invention.

As shown in FIGS. 11 and 12, the multilayer ceramic capacitor-mounted structure 50 according to the present example embodiment includes a multilayer ceramic capacitor 10 according to an example embodiment of the present invention and a mounting substrate 52. The mounting substrate 52 includes a core material 54, and conductive lands 56. The core material 54 is, for example, a substrate made of a material including a base material, which is a mixture of a glass cloth and a glass non-woven fabric, impregnated with an epoxy resin or a polyimide resin, or a ceramic substrate produced by baking a sheet including a mixture of a ceramic and glass. The core material 54 may be a substrate including a single layer, or a substrate including a laminate of multiple layers.

The thickness of the core material 54 of the substrate is not particularly limited and is, for example, preferably not less than about 200 μm and not more than about 800 μm.

One main surface of the core material 54 of the substrate defines a substrate-side mounting surface 54a on which the conductive lands 56 are disposed and which defines and functions as a mounting surface for the multilayer ceramic capacitor 10.

The conductive lands 56 include a first conductive land 56a, a second conductive land 56b, a third conductive land 56c, and a fourth conductive land 56d.

The first conductive land 56a is a portion which is electrically connected and mechanically bonded by a bonding material 58 to the first outer electrode 30a of the multilayer ceramic capacitor 10. The second conductive land 56b is a portion which is electrically connected and mechanically bonded by the bonding material 58 to the second outer electrode 30b of the multilayer ceramic capacitor 10. The third conductive land 56c is a portion which is electrically connected and mechanically bonded by the bonding material 58 to the third outer electrode 30c of the multilayer ceramic capacitor 10. The fourth conductive land 56d is a portion which is electrically connected and mechanically bonded by the bonding material 58 to the fourth outer electrode 30d of the multilayer ceramic capacitor 10.

The conductive lands 56 may be provided on the main surface of the core material 54, opposite to the substrate-side mounting surface 54a.

The material of the conductive lands 56 is not particularly limited. For example, a metal such as copper, gold, palladium, or platinum can be used. The thickness of the conductive lands 56, i.e., the dimension in the height direction x, is not particularly limited. For example, it is preferably not less than about 20 μm and not more than about 200 μm. A highly heat-resistant epoxy adhesive, for example, can be used as the bonding material 58.

In the above description, the mounting substrate 52 corresponds to a mounting substrate according to an example embodiment of the present invention. The core material 54 corresponds to a core material of a substrate according to an example embodiment of the present invention. The substrate-side mounting surface 54a corresponds to a mounting surface according to an example embodiment of the present invention. The conductive lands 56 correspond to connecting conductors according to an example embodiment the present invention. However, the connecting conductors are not limited to a land. Any conductor can be used, without limitation due to its usage, function, shape, name, etc., as long as it can be provided between a multilayer ceramic capacitor and a mounting substrate and can electrically connect them.

In the multilayer ceramic capacitor-mounted structure 50 shown in FIGS. 11 and 12, the multilayer ceramic capacitor 10 is mounted on the mounting substrate 52 with the second main surface 12b facing the substrate-side mounting surface 54a.

The multilayer ceramic capacitor-mounted structure 50 shown in FIGS. 11 and 12 directly reflects the advantageous effects of the multilayer ceramic capacitor 10 shown in FIG. 1. The current paths from the second inner electrode layers 16b of the multilayer ceramic capacitor 10 to the mounting substrate 52 can be reduced in length. Thus, by reflecting the advantageous effects of the multilayer ceramic capacitor 10, it possible to achieve the advantageous effect of improving the low ESL characteristics of the multilayer ceramic capacitor-mounted structure 50.

3. Method for Manufacturing Multilayer Ceramic Capacitor

An example of a method for manufacturing a multilayer ceramic capacitor according to an example embodiment of the present invention will now be described.

First, dielectric sheets for dielectric layers and a conductive paste for inner electrodes are prepared. The dielectric sheets and the conductive paste for inner electrode layers include a binder and a solvent. The binder and the solvent may be known ones.

The conductive paste for inner electrode layers is printed in a predetermined pattern on the dielectric sheets by, for example, screen printing or gravure printing, thus preparing dielectric sheets each having a pattern of first inner electrode layer formed thereon, and dielectric sheets each having a pattern of second inner electrode layer formed thereon.

More specifically, a screen plate to print the first inner electrode layers and a screen plate to print the second inner electrode layers are prepared separately. Using a printing machine capable of separate printing with the two types of screen plates, a pattern of the respective inner electrode layer can be printed.

A portion which is to make an inner layer portion 18 is formed by laminating the sheets, each having a first inner electrode layer or a second inner electrode layer printed thereon, such that a desired structure is obtained. The number of the sheets each having a first inner electrode layer printed thereon is larger than the number of the sheets each having a second inner electrode layer printed thereon. Further, two or more sheets, each having a first inner electrode layer printed thereon, are laminated successively.

Next, a predetermined number of dielectric sheets, having no printed pattern of inner electrode layer, are laminated to form a portion which is to make a second main surface-side outer layer portion 20b. Thereafter, the portion which is to make an inner layer portion 18, formed in the above-described process, is laminated to the portion which is to make a second main surface-side outer layer portion 20b. Subsequently, a predetermined number of dielectric sheets, having no printed pattern of inner electrode layer, are laminated to the portion which is to make an inner layer portion 18, thus forming a portion which is to make a first main surface-side outer layer portion 20a. A laminated sheet is thus produced.

The above lamination process is performed such that after a plurality of dielectric sheets, each having a pattern of first inner electrode layer, are laminated, one dielectric sheet having a pattern of second inner electrode layer is laminated thereto. The lamination pressure and/or the pressure bonding time is decreased as the lamination process progresses, i.e. as the process approaches the formation of the first main surface, so that first main surface-side dielectric sheets are softer, i.e. having a lower hardness, than second main surface-side dielectric sheets. Therefore, upon pressing of the laminated sheets, those portions which are to make the first extension portions and the second extension portions of the second inner electrode layers can be bent at an increasing degree of bending.

Subsequently, the laminated sheets are pressed in the direction of lamination by, for example, a hydrostatic press to produce a laminated block. The laminated sheets are pressed with rubber sheets, having a thickness of, for example, not less than about 0.1 mm and not more than about 0.2 mm, placed on the upper and lower surfaces of the laminated sheets, so that the portions which are to make the first extension portions and the second extension portions are bent.

The laminated block is then cut into laminated chips each having a predetermined size. The corners and ridges of each laminated chip may be rounded e.g. by barrel polishing.

A laminated chip is then fired to produce a multilayer body 12. While the firing temperature depends on the materials of the dielectric layers 14 and the inner electrode layers 16, it is, for example, preferably not less than about 900° C. and not more than about 1400° C.

Base Electrode Layer

Subsequently, a third base electrode layer 32c of a third outer electrode 30c is formed on the first side surface 12c of the multilayer body 12 obtained by the firing, and a fourth base electrode layer 32d of a fourth outer electrode 30d is formed on the second side surface 12d of the multilayer body 12.

In the case where a baked layer is formed as the base electrode layer 32, a conductive paste containing a glass component and a metal component is applied, followed by baking to form a baked layer as the base electrode layer 32. The baking temperature is, for example, preferably not less than about 700° C. and not more than about 900° C.

Various methods can be used to form the baked layer. For example, a method can be used which involves applying a conductive paste by extruding it through a slit. In the case of this method, by increasing the amount of the conductive paste extruded, the base electrode layer 32 can be formed not only on the first side surface 12c and the second side surface 12d but also on a portion of the first main surface 12a and a portion of the second main surface 12b.

A roller transfer method can also be used. In the case of the roller transfer method, when the base electrode layer 32 is to be formed not only on the first side surface 12c and the second side surface 12d but also on a portion of the first main surface 12a and a portion of the second main surface 12b, the base electrode layer 32 can be formed also on the portion of the first main surface 12a and the portion of the second main surface 12b by increasing the pressing pressure during roller transfer.

Next, a first base electrode layer 32a of a first outer electrode 30a is formed on the first end surface 12e of the multilayer body 12 obtained by the firing, and a second base electrode layer 32*b* of a second outer electrode 30*b* is formed on the second end surface 12*f* of the multilayer body 12.

As with the formation of the base electrode layer 32 of the third outer electrode 30*c* and the base electrode layer 32 of the fourth outer electrode 30*d*, in the case where a baked layer is formed as the first base electrode layer 32*a* and the second base electrode layer 32*b*, a conductive paste containing a glass component and a metal component is applied, followed by baking to form a baked layer as the base electrode layer 32. The baking temperature is, for example, preferably not less than about 700° C. and not more than about 900° C.

By using, for example, a dipping method as a method for applying the conductive paste, the first base electrode layer 32*a* can be formed over the entire or substantially the entire first end surface 12*e*, also covering a portion of the first main surface 12*a*, a portion of the second main surface 12*b*, a portion of the first side surface 12*c*, and a portion of the second side surface 12*d*. Similarly, the second base electrode layer 32*b* can be formed over the entire second end surface 12*f*, also covering a portion of the first main surface 12*a*, a portion of the second main surface 12*b*, a portion of the first side surface 12*c*, and a portion of the second side surface 12*d*.

A method which involves applying a conductive paste by extruding it through a slit or a roller transfer method, for example, can be used to form a baked layer as the base electrode layer 32 of the first outer electrode 30*a* and the second outer electrode 30*b*.

Regarding the baking, the third base electrode layer 32*c* of the third outer electrode 30*c*, the fourth base electrode layer 32*d* of the fourth outer electrode 30*d*, the first base electrode layer 32*a* of the first outer electrode 30*a*, and the second base electrode layer 32*b* of the second outer electrode 30*b* may be baked simultaneously. Alternatively, baking of the third base electrode layer 32*c* of the third outer electrode 30*c* and the fourth base electrode layer 32*d* of the fourth outer electrode 30*d* may be performed separately from baking of the first base electrode layer 32*a* of the first outer electrode 30*a* and the second base electrode layer 32*b* of the second outer electrode 30*b*.

Conductive Resin Layer

In the case where the conductive resin layer is used to form the base electrode layer 32, the conductive resin layer can be formed by the following method, for example. The conductive resin layer may be formed on the surface of the baked layer, or may be formed directly on the multilayer body 12 without forming the baked layer.

An example of a method for forming the conductive resin layer includes applying a conductive resin paste, containing a thermosetting resin and a metal component, onto the baked layer or the multilayer body 12, and heat-treating the paste at a temperature of, for example, about 250° C. to about 550° C. to thermally cure the resin. The atmosphere during the heat treatment is, for example, preferably an Ne atmosphere. Further, in order to prevent scattering of the resin and oxidation of the metal component, the oxygen concentration is, for example, preferably controlled at about 100 ppm or less.

As with the formation of the baked layer as the base electrode layer 32, the application of the conductive resin paste may be performed by a method which involves applying the conductive paste by extruding it through a slit, or by a roller transfer method.

Thin Film Layer

In the case where the thin film layer is used to form the base electrode layer 32, it can be formed by, for example, a thin film-forming method which involves performing masking, and then forming a thin film by sputtering or vapor deposition in an area where the outer electrode 30 is intended to be formed. The base electrode layer formed of the thin film layer is a layer having a thickness of about 1 μm or less and includes deposited metal particles.

Plating Electrode

It is possible not to provide the base electrode layer 32, and to provide plating electrodes on the first extended portions 27*a*, the second extended portions 27*b*, the first extension portions 28*a*, and the second extension portions 28*b* where the inner electrode layers 16 of the multilayer body 12 are exposed. In that case, the plating electrodes can be formed by the following example method.

Plating is performed on the first end surface 12*e* and the second end surface 12*f* of the multilayer body 12 to form lower plating electrodes on the first extended portions 27*a* and the second extended portions 27*b*, which are exposed portions of the first inner electrode layers 16*a*. Similarly, plating is performed on the first side surface 12*c* and the second side surface 12*d* of the multilayer body 12 to form lower plating electrodes on the first extension portions 28*a* and the second extension portions 28*b*, which are exposed portions of the second inner electrode layers 16*b*. The plating may be performed either by electrolytic plating or electroless plating. However, electroless plating requires a pretreatment e.g. with a catalyst to increase the plating deposition rate, and thus has the disadvantage of complicated process. Therefore, it is generally preferred to use electrolytic plating. Further, the plating is preferably performed by, for example barrel plating. As necessary, upper plating electrodes may be formed in the same or substantially the same manner on the surfaces of the lower plating electrodes.

Subsequently, as necessary, a plating layer 34 is formed on the surface of the base electrode layer 32, the surface of the conductive resin layer or the surfaces of the lower plating electrodes, and/or the surfaces of the upper plating electrodes.

More specifically, in the present example embodiment, for example, a Ni plating layer is formed as a lower plating layer on the base electrode layer 32, which is a baked layer, and a Sn plating layer is formed as an upper plating layer. The Ni plating layer and the Sn plating layer are sequentially formed by, for example, barrel plating. The plating may be performed either by electrolytic plating or electroless plating. However, electroless plating requires a pretreatment e.g. with a catalyst to increase the plating deposition rate, and thus has the disadvantage of complicated process. Therefore, it is generally preferred to use electrolytic plating.

The multilayer ceramic capacitor 10 according to the present example embodiment is manufactured in the manner described above.

While example embodiments of the present invention have been described, the present invention is not limited to these example embodiments.

Thus, various changes and modifications may be made to the above-described example embodiments in terms of mechanism, shape, material, quantity, position, arrangement, etc. without departing from the scope of the technical idea and objects of the present invention; such changes and modifications fall within the scope the present invention.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of laminated dielectric layers, a first main surface and a second main surface opposite to each other in a height direction, a first side surface and a second side surface opposite to each other in a width direction perpendicular or substantially perpendicular to the height direction, and a first end surface and a second end surface opposite to each other in a length direction perpendicular or substantially perpendicular to the height direction and the width direction;

first inner electrode layers on the plurality of laminated dielectric layers and extending to the first end surface and the second end surface;

second inner electrode layers on the plurality of laminated dielectric layers and extending to the first side surface and the second side surface;

a first outer electrode on the first end surface and connected to the first inner electrode layers;

a second outer electrode on the second end surface and connected to the first inner electrode layers;

a third outer electrode on the first side surface and connected to the second inner electrode layers; and a fourth outer electrode on the second side surface and connected to the second inner electrode layers; wherein the first inner electrode layers each include a first opposing portion facing the second inner electrode layers, a first extended portion extending from the first opposing portion to the first end surface, and a second extended portion extending from the first opposing portion to the second end surface;

the second inner electrode layers each include a second opposing portion facing the first inner electrode layers, a first extension portion extending from the second opposing portion to the first side surface, and a second extension portion extending from the second opposing portion to the second side surface;

the first extension portion of at least one of the second inner electrode layers is partially or entirely bent toward the second main surface, and the second extension portion of the at least one of the second inner electrode layers is partially or entirely bent toward the second main surface; and ends of the first and second extension portions of the at least one of the second inner electrode layers are exposed from the first and second side surfaces, and a distance between the exposed ends of the first and second extension portions and the second main surface is less than a distance between the second opposing portion of the at least one of the second inner electrode layers and the second main surface.

2. The multilayer ceramic capacitor according to claim 1, wherein a degree of bending is defined by $I_1$-$I_2$/$I_1$, where $I_1$ is a distance of a boundary point between the second opposing portion and the first extension portion or the second extension portion from the second main surface, and $I_2$ is a distance of an exposed point on the first extension portion or the second extension portion, extended to the side surface, from the second main surface; and the degree of bending of the first extension portion and the degree of bending of the second extension portion decrease with a decrease in a distance of the first extension portion and the second extension portion to the second main surface.

3. The multilayer ceramic capacitor according to claim 2, wherein the degree of bending is about 0.12 or less.

4. The multilayer ceramic capacitor according to claim 1, wherein, when a bend start point is defined as a point at which each of the first extension portion and the second extension portion begins to bend, the bend start point is closer to the second opposing portion when it is nearer to the second main surface.

5. The multilayer ceramic capacitor according to claim 1, wherein, when a bend end point is defined as a point at which each of the first extension portion and the second extension portion ceases to bend, the bend end point is closer to the second opposing portion when it is nearer to the second main surface.

6. The multilayer ceramic capacitor according to claim 1, wherein a number of the second inner electrode layers is not less than 2 and not more than 50.

7. The multilayer ceramic capacitor according to claim 1, wherein a distance in the height direction between the second opposing portion of one of the second inner electrode layers and the second opposing portion of another of the second inner electrode layers nearest to the one of the second inner electrode layers is not less than about 0.08 mm and not more than about 0.54 mm.

8. The multilayer ceramic capacitor according to claim 1, wherein a thickness of each of the first inner electrode layers is not less than about 0.5 µm and not more than about 1.1 µm.

9. The multilayer ceramic capacitor according to claim 1, wherein a thickness of each of the plurality of dielectric layers is not less than about 1.0 µm and not more than about 15 µm.

10. The multilayer ceramic capacitor according to claim 1, wherein a number of the first inner electrode layers is greater than a number of the second inner electrode layers.

11. A multilayer ceramic capacitor-mounted structure comprising:

a mounting substrate; and a multilayer ceramic capacitor mounted on the mounting substrate; wherein the multilayer ceramic capacitor is the multilayer ceramic capacitor according to claim 1;

the mounting substrate includes a core material of the substrate, a first connecting conductor on the core material and connected to the first outer electrode, a second connecting conductor on the core material and connected to the second outer electrode, a third connecting conductor on the core material and connected to the third outer electrode, and a fourth connecting conductor on the core material and connected to the fourth outer electrode; and the multilayer ceramic capacitor is mounted such that the second main surface faces the mounting substrate.

12. The multilayer ceramic capacitor-mounted structure according to claim 11, wherein a degree of bending is defined by $I_1$-$I_2$/$I_1$, where $I_1$ is a distance of a boundary point between the second opposing portion and the first extension portion or the second extension portion from the second main surface, and $I_2$ is a distance of an exposed point on the first extension portion or the second extension portion, extended to the side surface, from the second main surface; and the degree of bending of the first extension portion and the degree of bending of the second extension portion decrease with a decrease in a distance of the first extension portion and the second extension portion to the second main surface.

13. The multilayer ceramic capacitor-mounted structure according to claim 12, wherein the degree of bending is about 0.12 or less.

14. The multilayer ceramic capacitor-mounted structure according to claim 11, wherein, when a bend start point is defined as a point at which each of the first extension portion and the second extension portion begins to bend, the bend start point is closer to the second opposing portion when it is nearer to the second main surface.

15. The multilayer ceramic capacitor-mounted structure according to claim 11, wherein, when a bend end point is defined as a point at which each of the first extension portion and the second extension portion ceases to bend, the bend end point is closer to the second opposing portion when it is nearer to the second main surface.

16. The multilayer ceramic capacitor-mounted structure according to claim 11, wherein a number of the second inner electrode layers is not less than 2 and not more than 50.

17. The multilayer ceramic capacitor-mounted structure according to claim 11, wherein a distance in the height direction between the second opposing portion of one of the second inner electrode layers and the second opposing portion of another of the second inner electrode layers nearest to the one of the second inner electrode layers is not less than about 0.08 mm and not more than about 0.54 mm.

18. The multilayer ceramic capacitor-mounted structure according to claim 11, wherein a thickness of each of the first inner electrode layers is not less than about 0.5 μm and not more than about 1.1 μm.

19. The multilayer ceramic capacitor-mounted structure according to claim 11, wherein a thickness of each of the plurality of dielectric layers is not less than about 1.0 μm and not more than about 15 μm.

20. The multilayer ceramic capacitor-mounted structure according to claim 11, wherein a number of the first inner electrode layers is greater than a number of the second inner electrode layers.

* * * * *